United States Patent [19]

Omura et al.

[11] 4,027,211

[45] May 31, 1977

[54] ELECTRICAL VIBRATION TYPE COMPRESSOR

[75] Inventors: Morikazu Omura; Yukio Okuda; Hiroyuki Kainuma, all of Tokyo, Japan

[73] Assignee: Sawafuji Electric Company, Ltd., Tokyo, Japan

[22] Filed: Apr. 1, 1975

[21] Appl. No.: 564,135

[52] U.S. Cl. .............................. 318/127; 318/130; 318/132; 310/27; 417/417
[51] Int. Cl.² ...................................... H02K 33/18
[58] Field of Search ..................... 417/416–418; 310/15, 27; 318/127–133

[56] References Cited

UNITED STATES PATENTS

| 3,469,163 | 9/1969 | Mathews | 310/27 X |
| 3,575,649 | 4/1971 | Mathews | 318/127 |
| 3,671,829 | 6/1972 | Mathews | 318/128 |
| 3,676,758 | 7/1972 | Mathews | 318/128 |
| 3,729,691 | 4/1973 | Beiswinger et al. | 318/132 X |
| 3,781,140 | 12/1973 | Gladden | 310/27 X |

*Primary Examiner*—Donovan F. Duggan

[57] ABSTRACT

An electrical vibration type compressor comprising a drive coil vibratably supported in a mechanical vibration system, a piston driven by the drive coil, at least one main semiconductor element with a control electrode which performs the switching control of a drive current to the drive coil, and a detecting means consisting of at least one detecting semiconductor element with a control electrode detecting the vibration of the drive coil to control the conduction and cutoff of the main semiconductor element with a control electrode and at least one timeconstant circuit; whereby the feedback transformer which has so far been used in a device of this type to supply a feedback current to the main semiconductor element with a control electrode is eliminated, and the switching operation is properly performed at the top and bottom dead centers of the piston.

28 Claims, 40 Drawing Figures

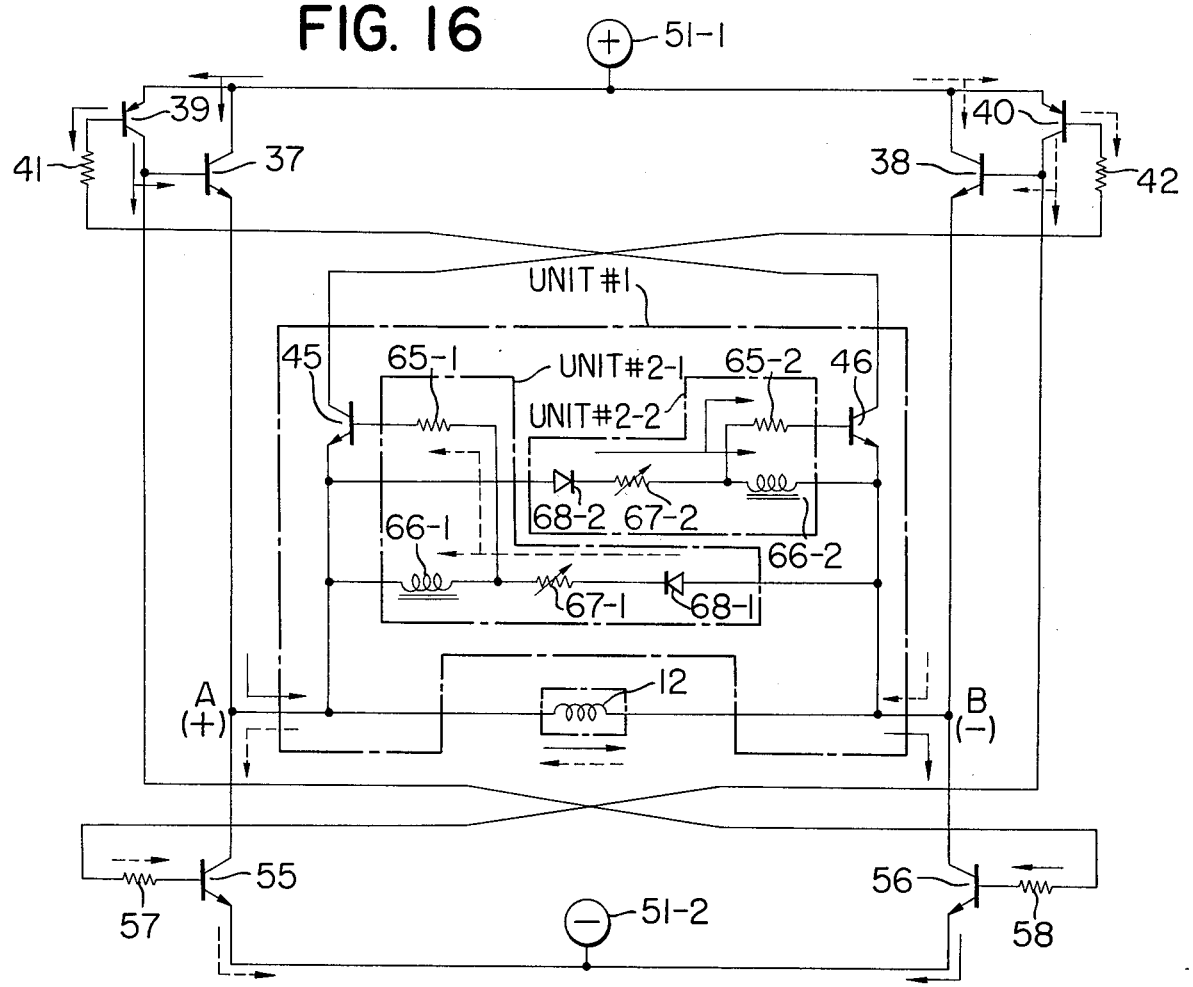
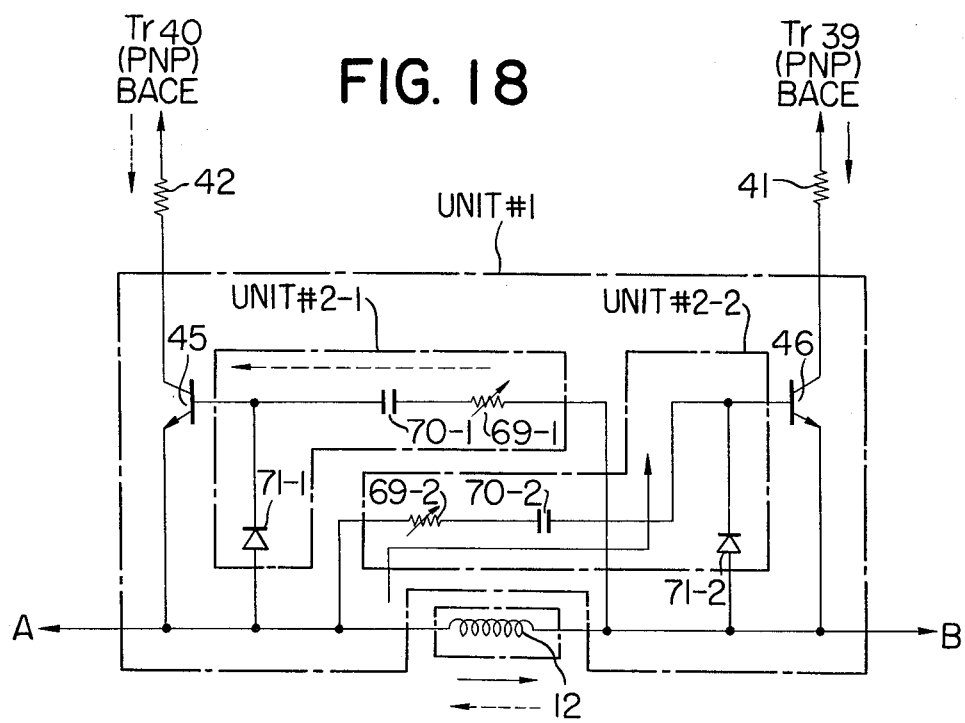

ELECTRICAL VIBRATION TYPE COMPRESSOR

BACKGROUND OF THE INVENTION

1. Field of the Invention

This invention relates generally to an electrical vibration type compressor, and particularly to an electrical vibration type compression wherein a detecting means for detecting the vibration of the drive coil is provided so that a feedback transformer for supplying feedback current is eliminated and the switching operation is properly performed at the top and bottom dead centers of the piston.

2. Description of the Prior Art

Electrical vibration type compressors are used as a compressing means for refrigerators used on board camping cars, trailers, pleasure boats, etc., most of which are powered by small-capacity batteries installed on such vehicles and boats. This necessitates a device which converts d-c current into a-c current as a driving source for the compressor. In this respect, a compressor used for the above-mentioned purposes is required:

1. to have an excellent operating efficiency to minimize the consumption of battery power since batteries used are generally of small capacity.
2. to be small in size and light in weight, including its drive mechanism.

To meet these requirements, an electrical vibration type compresor utilizing the resonance phenomenon between the mechanical and electrical vibrations has been developed and is now widely used for the above-mentioned purposes. Although this type of compressor utilizes the resonance between the mechanical and electrical vibrations, it is not always operated in the best resonating condition since the mechanical and electrical vibration cycles tend to disagree due to changes in discharge and suction pressures of refrigerant gas caused by changes in the ambient temperature of the refrigerator and other conditions, changes in the natural vibration cycle of the mechanical vibration system, and ununiform mechanical characteristic of the resonating spring caused in the production process.

Taking into consideration the above points, a drive mechanism has been devised which supplies the drive coil of the compressor with an alternating current produced through the switching operation of transistors, which is performed based on the principle that a transistor is in the saturation region when it is in the switching condition that $$I_C \leq h_{FE} \cdot I_B \tag{1}$$

where $I_C$ is the collector current; $I_B$ the base current; $h_{FE}$ the current amplification factor of the switching transistor, while the transistor is shifted to the active region when its switching condition is $$I_C > h_{FE} \cdot I_B \tag{2}$$

with this type of drive mechanism, usually feedback controls the above-mentioned base current $I_B$ through a transformer, but there are some technical problems yet to be improved to meet the requirement (2) above, that is, the small size and light weight. The drive circuit for this type of compressor has been such that a feedback transformer is used to supply a control signal corresponding to the turning-on and -off states of the main semiconductor element to the control electrode of the main semiconductor element so as to cause the main semiconductor element to switch in accordance with the top and bottom dead centers of the piston detected by a detecting means. In other words, a transformer which is energized by the output current of the main semiconductor element has been provided and the feedback winding of the transformer has been designed to supply the control electrode of the main semiconductor element with a feedback current in such a manner that the feedback current is caused to decrease, when the main semiconductor element is turned from the ON state to the OFF state, and thereby the main semiconductor element is caused to shift further to the OFF state, and the feedback current is caused to increase, when the main semiconductor element is turned from the OFF state to the ON state, and thereby the main semiconductor element is caused to shift further to the ON state.

However, using a feedback transformer mentioned above is not favorable since the operating performance is largely dependent on the characteristics of the iron core and the construction of the device tends to be of large size. For this reason, a means to eliminate the transformer has been devised which supplies such a feedback current as to facilitate the switching of the main semiconductor element when the main semiconductor element is turned from the ON state of the OFF state, or from the OFF state to the ON state.

SUMMARY OF THE INVENTION

It is an object of this invention to provide an electrical vibration type compressor which solves the above-mentioned problems.

It is another object of the present invention to provide an electrical vibration type compressor which solves the above-mentioned problems by taking advantage of the fact that the operation of the main semiconductor element in its saturation and active regions are determined by the relation between the input current supplied to the control electrode of the main semiconductor element and the output current of the main semiconductor element.

Yet another object of this invention to provide an electrical vibration type compressor wherein the above-mentioned switching of the main semiconductor element between the active and saturation regions is properly performed by supplying the input current via a detecting means including a timeconstant circuit.

It is further more object of this invention to provide an electrical vibration type compressor wherein an imbalance is forcibly produced among each main semiconductor element during the initial starting operation to facilitate the starting of the compressor since, in the above-mentioned system of supplying the input current using a detecting means, a circuit imbalance hardly occurs when the power source is switched on, which makes the starting of the compressor difficult.

It is a further object of the present invention to provide an electrical vibration type compressor wherein each semiconductor element is protected from thermal damage.

It is a still further object of the present invention to provide an electrical vibration type compressor wherein the a-c operation is made possible in addition to the d-c operation, and, during the a-c operation, the charging to the d-c power source is made possible by utilizing the circuit for the d-c operation.

These together with other objects which will become subsequently apparent reside in the details of construction and operation as more fully hereinafter described, referring to the drawings.

BRIEF DESCRIPTION OF THE DRAWINGS

FIGS. 7 through 28 show embodiments of the present invention.

DETAILED DESCRIPTION OF THE EMBODIMENT

Figure 1:
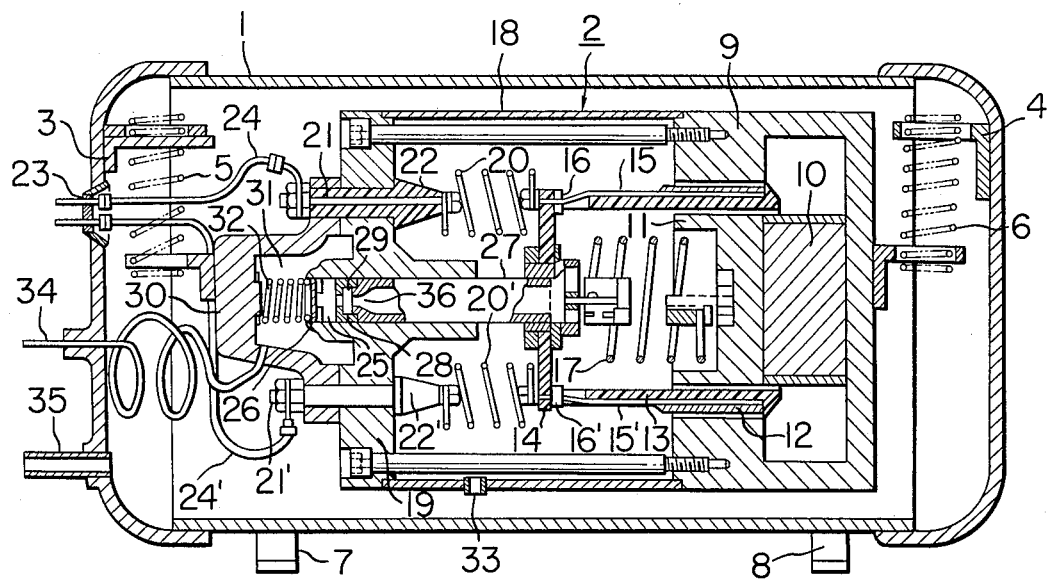
FIGS. 1 through 4 illustrate the construction and function of an electrical vibration type compressor embodying the present invention.

FIG. 1 shows the mechanical construction of an electrical vibration type compressor embodying the present invention. In the figure, the numeral 1 designates an enclosed cylindrical casing in which a compressor unit 2 is suspended from brackets 3 and 4 through coil springs 5 and 6, and which is equipped with mounting feet 7 and 8. The compressor unit 2 comprises a cylindrical yoke 9, a cylindrical permanent magnet 10 fitted to the inner bottom surface of the cylindrical yoke 9, a cup-shaped magnetic pole 11 fitted to the opposite end face (the left end face in FIG. 1) of the permanent magnet 10, a cylindrical drive coil 12 loosely fitted in the annular space between the outer surface of the magnetic pole 11 and the inner wall of the yoke 9, a disk-shaped support plate 14 supporting the drive coil 12 by means of a plurality of support members 13, conductor plates 15 and 15' serving as electric conductors connected to the drive coil 12, insulators 16 and 16' electrically insulating the support plate 14 from the conductor plates 15 and 15', a resonance coil spring 17 disposed in the space between the inside of the cup-shaped magnetic pole 11 and the support plate 14, a cylindrical spacer case 18 disposed concentrically with the yoke 9, a cylinder 19 disposed at an end of the spacer case 18, lead springs 20 and 20', terminal screws 21 and 21', insulators 22 and 22' insulating the terminal screws 21 and 21' from the cylinder 19, lead wires 24 and 24' connecting the terminal screws 21 and 21' and the terminals 23 of the casing 1, a valve chest 25 at an end (the left end in FIG. 1) of the cylinder 19, a valve element 26, a piston 27, a valve chest 28 at an end (the left end in FIG. 1) of the piston 27, a valve element 29, a cap-shaped head cover 30 covering the valve chest 25, a valve chest 31 formed between the valve element 26 and the head cover 30, and a coil spring 32 disposed in the valve chest 31 in its loaded state. A refrigerant passage 33 is provided at the lower part of the spacer case 18 to connect the interior and exterior of the spacer case 18. A refrigerant outlet tube 34 is fitted to the head cover 30 to connect the valve chest 31 of the head cover 30 and the outside of enclosed cylindrical casing 1 of the compressor. A refrigerant inlet tube 35 also connects the interior and the outside of casing 1 of the compressor.

A hole 36 is provided at the left end (as seen in FIG. 1) of the hollow piston 27, which connects the cavity of the piston 27 with the valve chest 25 via the valve element 29.

The piston 27 reciprocates as the drive coil 12 vibrates in a manner as described more fully below, and refrigerant gas enters the casing 1 through the inlet tube 35 and flows into the spacer case 18 via the passage 33. The refrigerant is then discharged from the outlet tube 34 via the hollow part of the piston 27 and the valve chests 28, 25 and 31.

The mechanical vibration system consists essentially of the drive coil 12, piston 27 and members jointing them, and the coil spring 17. The mechanical vibration system has a particular natural vibration cycle dependent on its structure and other conditions.

Figure 2:
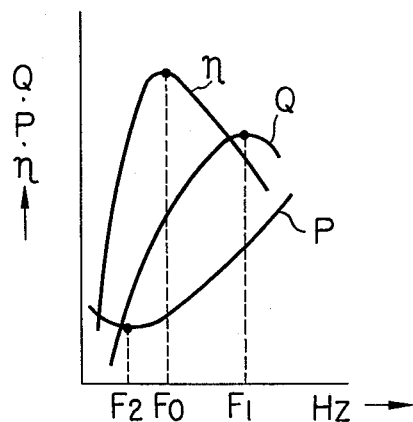

FIG. 2 shows the characteristics of an electrical vibration type compressor of this type. In FIG. 2, the horizontal axis represents the vibration frequency of the compressor and the vertical axis the gas discharge rate Q, input power P and compression efficiency $\eta$ of the compressor. As clearly shown in the figure, the peak of the compression efficiency $\eta$ is between the peak of the discharge rate Q and the bottom of the input power P. At this point the electrical power factor $\cos \Psi$ of the compressor is nearly unity and the frequency $F_0$ coincides with the electrical and mechanical resonant frequency of the electrical vibration type compressor. $F_1$ represents the frequency at which the discharge rate Q becomes maximum, and $F_2$ the frequency at which the input power P becomes minimum, respectively.

Figure 3A:
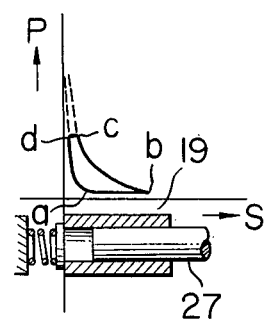
Figures 3B, 3C, 3D:
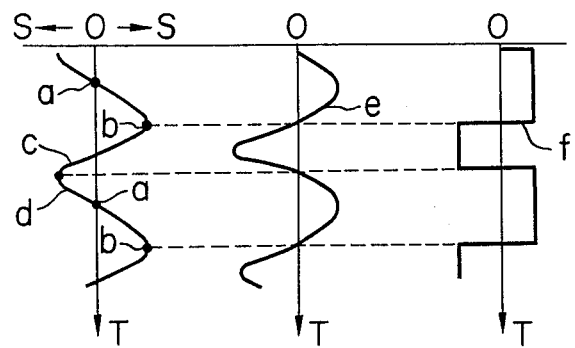

FIG. 3 explains the mechanical vibration of an electrical vibration type compressor constructed as mentioned above in its steady operation. In FIG. 3(A), as the piston 27 starts the suction stroke from its neutral point $a$, reaches its bottom dead center $b$, and then begins the compression stroke, the S-P characteristic curve indicating the relationship between the displacement S and the pressure P in the cylinder 19 forms a closed loop $a$, $b$, $c$, $d$, $a$ as shown in the figure. The vibration curve of a mechanical vibration system, therefore, is asymmetrical as seen in FIG. 3(B), with both the displacement and cycle of the compression stroke being smaller than the suction stroke.

To drive such a vibration system which vibrates asymmetrically by a symmetrical current would inevitably lower its efficiency. Ideally, a mechanical vibration system should be driven by applying a waveform $e$ in FIG. 3(C), i.e., a waveform in phase with the vibration of the mechanical vibration system. The same effect will also be achieved by a square wave $f$ as shown in FIG. 3(D).

Figure 4A:
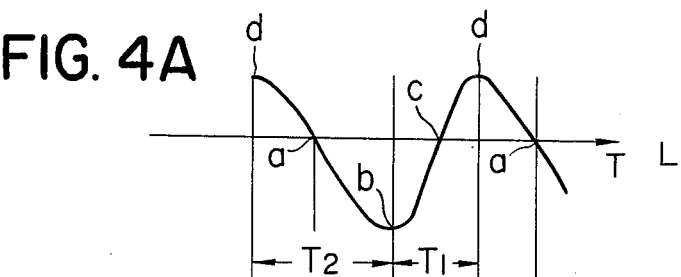
Figure 4B:
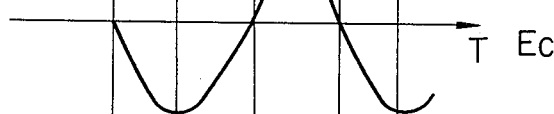
Figure 4C:

Due to the change in the amplitude of the mechanical vibration in the compressor as shown in FIG. 3(B), a counter electromotive force $E_C$ as in FIG. 4(B) is generated across the drive coil 12. This situation will be described in FIG. 4 in further detail. FIG. 4(A) shows the amplitude waveform corresponding to FIG. 3(B). The counter electromotive force assumes a waveform shown in FIG. 4(B) with respect to the amplitude change, being zero at the top and bottom dead center points of the drive coil 12. Since there is a difference in terms of time between the compression stroke $T_1$ and the suction stroke $T_2$, the waveform of the counter electromotive force does not assume a perfect sinusoidal shape, but a somewhat distorted waveform. Changes with time lapse in the impedance Z of the electricl vibration type compressor, therefore, assume a waveform obtained by superimposing the counter e.m.f. waveform as in FIG. 4(B) on the basic waveform. The impedance Z is minimum at zero counter e.m.f. and maximum at the maximum counter e.m.f., as illustrated in FIG. 4(C).

Figure 4D:
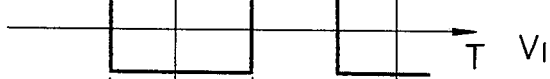
Figure 4E:
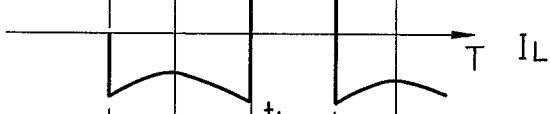

If a square waveform voltage $V_1$ shown in FIG. 4(D) in phase with the counter electromotive force $E_C$ as in FIG. 4(B) is applied to the compressor, a current $I_L$ flowing in the compressor becomes maximum at the lowest value of impedance and minimum at the highest value of impedance, as shown in FIG. 4(E), being in phase with $V_1$.

Figure 4F:
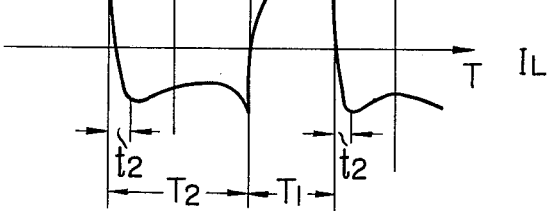

The actual current, however, does not rise vertically, but assumes a curve which lags by a time $t_1$ during the compression stroke and by a time $t_2$ during the suction stroke in reaching its maximum value as shown in FIG. 4(F) due to the inductance, including the driving power circuit, of the compressor.

It follows from the above description that the half wave of the drive current $I_L$ of the compressor in the steady operation has two peaks and a trough.

A means including an electrical vibration system using transistors to supply a drive current which is nonsymmetrical with respect to the polarity as described above has so far been developed. That is, a drive mechanism is known which causes transistors to switch based on the principle that a transistor is in the saturation region when $$I_C \leq I_B \cdot h_{FE} \tag{1}$$

where $I_C$ is the collector current; $I_B$ is the base current; $h_{FE}$ is the current amplification factor of the switching transistor, while the transistor is shifted to the active region when $$I_C > h_{FE} \cdot I_B \tag{2}$$

However, in the conventional electrical vibration system of this type, the base current $I_B$ of the above transistor is feedback controlled using an unsaturated transformer.

This invention is a new departure from the conventional electrical vibration system in which the use of such a transformer is taken for granted, in that the switching timing of the switching transistor is detected by providing a detecting means for detecting the mechanical vibration in parallel with the drive coil of the compressor. Description will be made in the following about the embodiment shown in FIG. 5.

Figure 5:
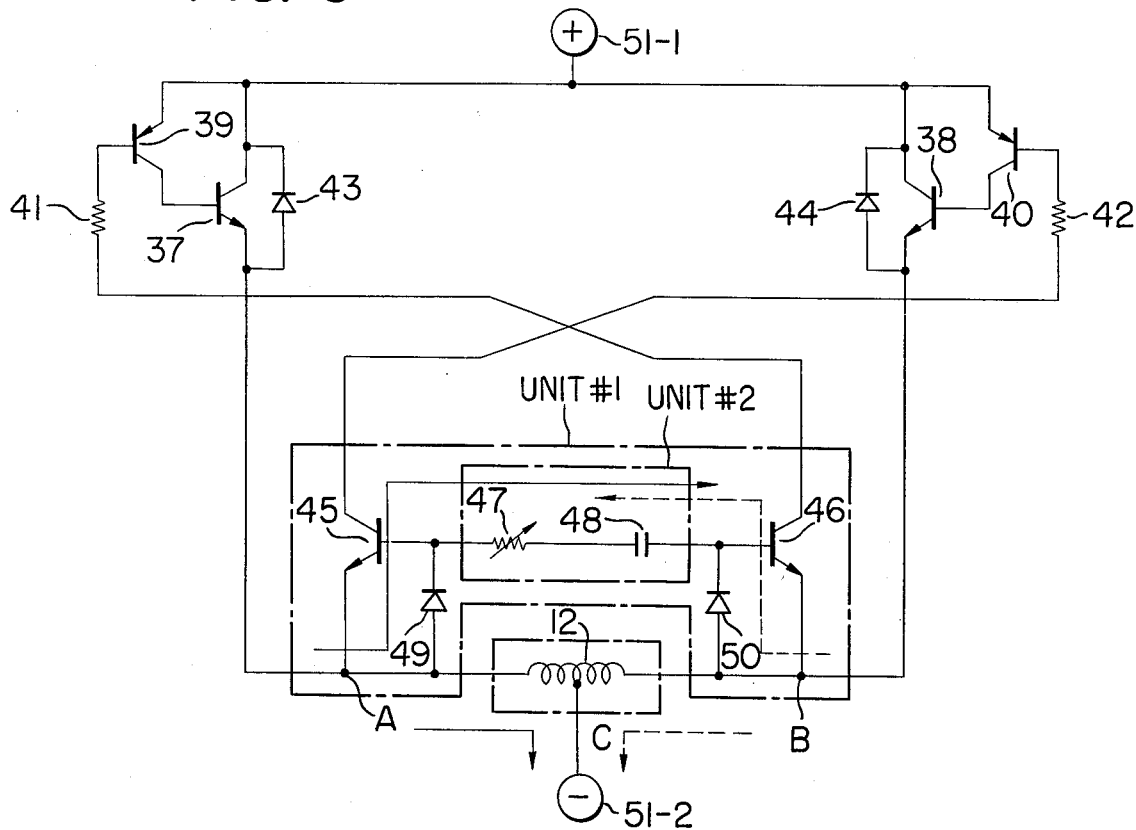
FIG. 5 shows an embodiment of the present invention.

In FIG. 5, the numeral 12 refers to a drive coil of an electrical vibration type compressor, 37 and 38 to main transistors which alternately repeat the on-off operation to supply an alternating current to the drive coil 12, the numerals 39 and 40 to transistors which are Darlington connected to the transistors 37 and 38, the numerals 41 and 42 to resistors for limiting the base currents of the transistors 39 and 40, and the numerals 43 and 44 to diodes which constitute a discharge path for a capacitor 48 as described later and at the same time protect the circuit elements from damage due to the reversed connection of the d-c power. The numerals 45 and 46 each designate a first and second detecting transistor, here after called the detecting transistors 45 and 46, 47 a variable resistor, 48 a capacitor which constitutes a timeconstant circuit in conjunction with the variable resistor 47, the numerals 49 and 50 diodes which constitute a charge and discharge path for the capacitor 48, the numerals 51-1 and 51-2 the positive and negative terminals of the unidirectional power source, respectively. The drive coil 12 has a center tap C which is connected to the negative terminal 51-2 of the unidirectional power source.

Now, assume that the unidirectional power source is turned on in the polarity as shown in the figure, and the circuit is put into the steady operation and switched to a state where the terminal A is + and the terminal C is −. Then, a current is supplied to the A-side winding of the drive coil 12 in the direction of the arrow with a solid line as shown in the figure, and this current induces positive voltage on the center tap $c$ and negative voltage on the terminal B of the B-side winding of the drive coil 12. This induced voltage is almost equal to the voltage $E_{(V)}$ across the terminal A and the central tap C. Therefore, the voltage across the terminals A and B can be considered to be $2E_{(V)}$.

Owing to the voltage across the terminals A and B, a current is supplied to the detecting means, or a unit No. 1 in the direction of the arrow with a solid line as shown in the figure. In other words, a current is supplied to the base of the detecting transistor 46 via the diode 49, the variable resistor 47 and the capacitor 48. Consequently, the detecting transistor 46 is turned on, the transistor 39 is turned on via the resistor 41, and then the main transistor 37 is turned on, thus a drive current is supplied to the drive coil 12 in the direction of the arrow with a solid line as shown in the figure. As will be described later in FIGS. 6(A) and 6(B), when the main transistor 37 is switched from the ON state to the OFF state, the potential on the terminal A drops simultaneously with the switching, and the capacitor 48 begins to discharge. The discharge path is constituted by a circuit of the capacitor 48 — the variable resistor 47 — the base of the detecting transistor 45 — the emitter of the detecting transistor 45 — the diode 43 — the collector of the main transistor 38, the emitter of the main transistor 38 — the diode 50 — the capacitor 48. That is, the moment the main transistor 37 is shifted to the active region, the detecting transistor 45 starts conducting due to the discharged current and the transistor 40 is turned on, with the consequence that the main transistor 38 is turned on. As the result, a current is supplied to the drive coil 12 in the direction of the arrow with a broken line as shown in the figure, and at the same time, a voltage $2E(V)$, which is opposite in polarity to that in the case where the main transistor 37 is in the ON state, is impressed across the terminals A and B. Consequently, a current is fed to the unit No. 1, or the detecting means in the direction of the arrow with a broken line as shown in the figure, i.e., from the diode 50 to the base of the detecting transistor 45 via the capacitor 48 and the variable resistor 47. And, the main transistor 38 is switched from the ON state to the OFF state, as will be described later in FIGS. 6(A) through 6(C). The potential on the terminal B drops simultaneously with the switching, so the capacitor 48 begins discharging through the discharge path consisting of the capacitor 48, the base of the detecting transistor 46, the emitter of the detecting transistor 46, the diode 44, the collector of the main transistor 37, the emitter of the main transistor 37, the diode 49, the variable resistor 47 and the capacitor 48. In other words, since the detecting transistor 46 is turned on by the above-mentioned discharge current, the main transistor 37 is turned on simultaneously with the main transistor 38 switched from the OFF state to the ON state. The same operation is subsequently repeated and the main transistors 37 and 38 are repeatedly turned on and off alternately, thus an alternating current is supplied to the compressor. The switching operation of the main transistors 37 and 38 will be described in the following, referring to FIGS. 6(A) and 6(C).

Figure 6A:
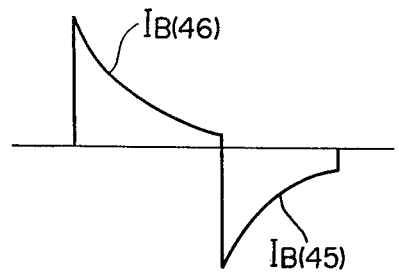
FIGS. 6(A) through 6(C) illustrate the switching timings of the drive mechanism.

FIG. 6(A) shows the waveform representing one cycle of the charge and discharge current of the capacitor 48, the positive half wave of which represents the waveform of the current in the direction of the arrow with a solid line shown in the detecting means unit No. 1 in FIG. 5, or the waveform of the base current of the detecting transistor 46, and the negative half wave of which representing the waveform of the current in the direction of the arrow with a broken line in the figure, or the waveform of the base current of the detecting transistor 45.

The waveform of the charge and discharge current of the capacitor 48 is based on the time constant determined by the circuit resistance value (the resistance value of the variable resistor 47 and other elements) and the capacitance value of the capacitor 48.

Figure 6B:
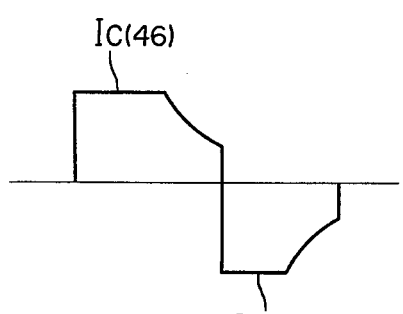

FIG. 6(B) represents the waveform of the collector current of the detecting transistors 45 and 46. This collector current is essentially the amplification factor of the detecting transistors 45 and 46 multiplied by the respective base currents, but actually assumes the waveform shown in FIG. 6(B) because it is limited by the resistors 41 and 42. The waveforms of the base currents $I_B(39)$ and $I_B(40)$ of the transistors 39 and 40 are the same as those of the currents $I_C(46)$ and $I_C(45)$ shown in FIG. 6(B).

Figure 6C:
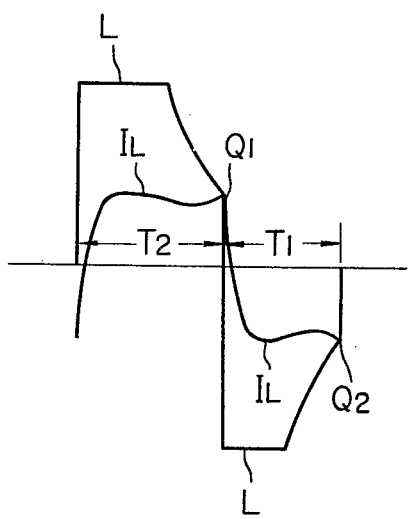

FIG. 6(C) illustrates the switching timing of the main transistors 37 and 38. In the figure, the waveform $I_L$ represents the waveform of the drive current shown in FIG. 4(F), or the collector currents $I_C(37)$ and $I_C(38)$ of the main transistors 37 and 38, and the waveform L represents the switching level of the main transistors 37 and 38. This waveform L is determined by the collector currents $I_C(46)$ and $I_C(45)$ of the transistors 46 and 45 shown in FIG. 6(B), and the slope of the waveform L is determined by the timeconstant of the timeconstant circuit (the variable resistor 47 and the capacitor 48) comprising the detecting means, or the unit No. 1. Based on the principle that the main transistors 37 and 38 are in the saturation region as long as they satisfy the above-mentioned equation (1), but are shifted to the active region when they satisfy the equation (2), the main transistor 37 is shifted from the saturation region to the active region at the point $Q_1$. Consequently, voltage drop occurs across the collector and emitter of the main transistor 37, the voltage of the point A drops, the base current of the detecting transistor 46 decreases, and thus the main transistor 37 is turned off.

Meanwhile, the main transistor 38 is shifted from the saturation region to the active region at the point $Q_2$. In this way, the main transistor 37 and 38 are switched at the points $Q_1$ and $Q_2$, respectively, but their switching cycles $T_2$ and $T_1$ equal the suction time $T_2$ and the compression time $T_1$ in FIG. 4(F). In other words, each element is selected to meet the above-mentioned conditions so that the switching cycles $T_2$ and $T_1$ equal the suction time $T_2$ and the compression time $T_1$.

Thus it is there is described an electrical vibration type compressor which synchronizes perfectly each time cycle of the discharge and suction stroke time.

Figure 7:
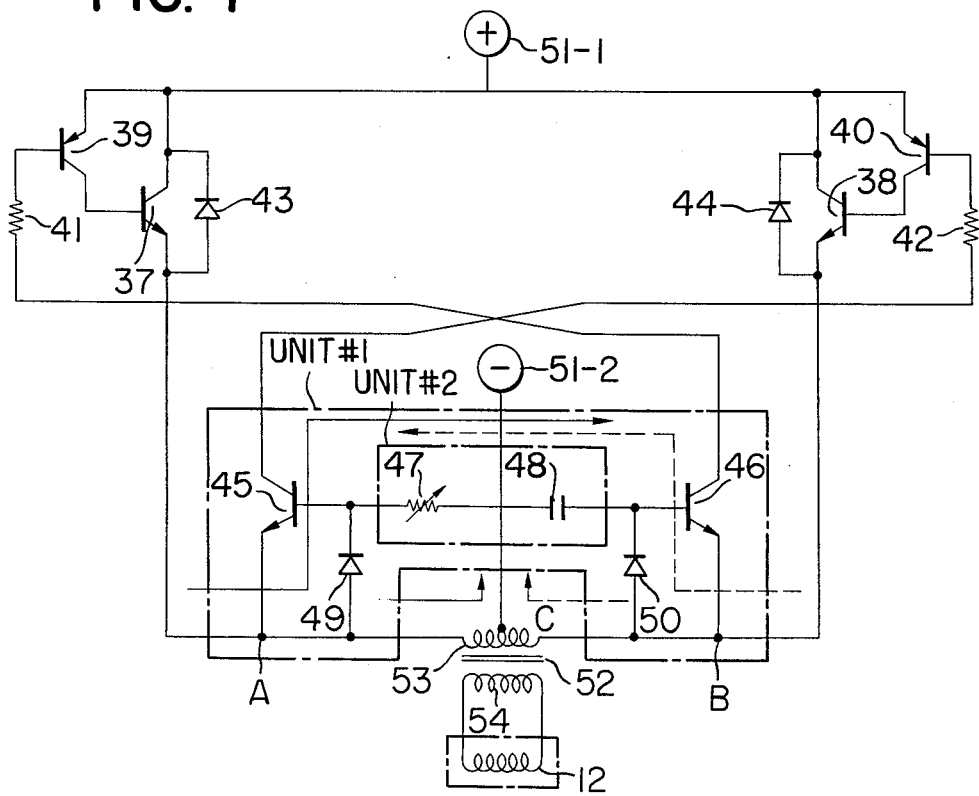

FIG. 7 shows a modified version of the embodiment shown in FIG. 5, in which current is supplied to the drive coil 12 via an output transformer 52. In this embodiment, transistors 45 and 46, a variable resistor 47, a capacitor 48, and diodes 49 and 50 are connected to both ends of the input coil 53 of the output transformer 52 so as to control the main transistors 37 and 38. In this embodiment, the operation is exactly the same as that of the embodiment shown in FIG. 5, except that the output transformer 52 is employed in the circuit. Moreover, the output transformer 52, which is represented by an insulating transformer in FIG. 7, may be an auto-transformer type that is effective in reducing the loss and size of the transformer.

Furthermore, FIG. 5 and 7 show the main transistors 37 and 38 which are Darlington connected to the transistors 39 and 40, but the circuit can be configurated with only two main transistors 37 and 38 that assume the main transistors 37 and 38 are PNP type.

Figure 8:
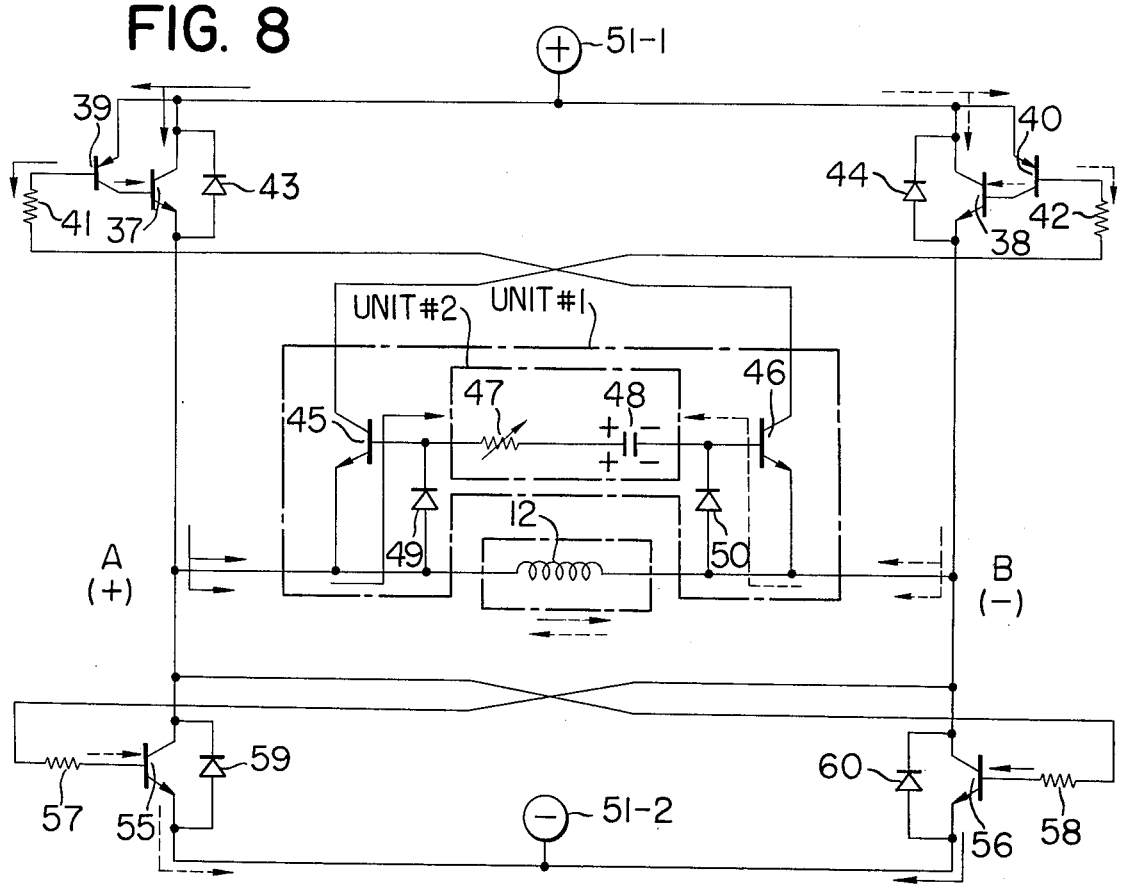

FIG. 8 shows an embodiment in which four main transistors 37, 38, 55 and 56 are bridge connected, causing each pair of the main transistors 37 and 56 and the main transistors 38 and 55 to turn on and off alternately while the embodiment in FIGS. 5 and 7 is a push-pull type inverter circuit taking advantage of the on-off operation of two main transistors 37 and 38.

In FIG. 8, the numerals 57 and 58 are the base resistors of the main transistors 55 and 56, respectively, the numerals 59 and 60 are diodes which constitute a discharge path as the diodes 43 and 44 in FIG. 5 and also prevent the reverse connection of the unidirectional power source. The other numerals correspond to like numerals in FIG. 5.

Now, assume that the unidirectional power source is turned on in the polarity as shown in the figure, the circuit is put into the steady operation and switched to a state where the terminal A is + and the terminal B is —. Then, the capacitor 48 is charged, as shown by the arrow with a solid line in the figure, through the diode 49 and the variable resistor 47. At this moment, the charge current supplies the detecting transistor 46 with a base current, and thus the detecting transistor 46 is turned on. Then, the transistor 39 and the main transistor 37 are successively turned on, and the main transistor 56 is turned on the moment the main transistor 37 is conducted. In this way a drive current is supplied to the drive coil 12. The circuit current in this case flows in the direction of the arrow with a solid line shown in the figure.

The charge current of the capacitor 48, that is, the base current of the detecting transistor 46 assumes the waveform as shown in FIG. 6(A) as in the case of the embodiment in FIG. 5. The main transformer 37 is switched to the OFF state at the point $Q_1$ as shown in FIG. 6(C). The main transistor 56 is turned off simultaneously with the main transistor 37 being turned off. When the main transistors 37 and 56 are turned off, the potential on the terminal A drops and the capacitor 48 begins discharging through a discharge path formed by a circuit of the capacitor 48, the variable resistor 47, the base of the detecting transistor 45, the emitter of the detecting transistor 45, the diode 43, the collector of the main transistor 38, the emitter of the main transistor 38, the diode 50 and the capacitor 48, or a circuit of the capacitor 48, the variable resistor 47, the base of the detecting transistor 45, the emitter of the detecting transistor 45, the collector of the main transistor 55, the emitter of the main transistor 55, the diode 60, the diode 50 and the capacitor 48. Since the discharge current supplies the base of the detecting transistor 45 with a current, the detecting transistor 45 is turned on, and the transistor 40 and the main transistor 38 are successively turned on, and the main transistor 55 is turned on the moment the main transistor 38 is conducted, thus the circuit current flowing in the direction of the arrow with a broken line shown in the figure is supplied the drive coil 12.

In this case, a current is supplied to the detecting means unit No. 1 in the direction of the arrow with a broken line shown in the figure via the diode 50, the capacitor 48 and the variable resistor 47. This current, which is equal to the base current of the detecting transistor 45, is as shown in FIG. 6(A). The main transistor 38 is switched at the point $Q_2$ as shown in FIG. 6(C). When the main transistor 38 is turned off, the main transistor 55 is turned off, and at the same time the main transistors 37 and 56 are in turn switched on as mentioned above.

Next, description will be made in the following about the switching operation of the main transistors 37, 38 55 and 56.

If the main transistor 37, which is now in the ON state (the main transistor 56 is also in the ON state), is shifted to the condition of the above-mentioned equation (2) or to the active region, voltage drop occurs across the collector and emitter of the main transistor 37, the voltage on the terminal A approaching the voltage on the terminal 51-2. Consequently, the base current supplied to the base of the main transistor 56 via the base resistor 58 decreases. When the main transistor 37 is completely turned off, the voltage on the terminal A becomes almost equal to the voltage on the terminal 51-2. As the result, the base current supplied to the base of the main transistor 56 via the base resistor 58 stops to flow, and thus the main transistor 56 is turned off.

Next, description will be made about the state where the main transistor 56 is turned on in synchronism with the main transistor 37. When the main transistor 37 is turned on, the voltage on the terminal A approaches the voltage on the terminal 51-1 and the base current of the main transistor 56 is supplied, so the main transistor 56 is turned on in synchronism with the main transistor 37. In other words, the main transistor 56 is turned on and off in synchronism with the on-and-off operation of the main transistor 37. Similarly, the main transistor 55 is also turned on and off in synchronism with the on-off operation of the main transistor 38.

As mentioned above, the operation of the detecting means unit No. 1 in on-off controlling the pair of the main transistors 37 and 56 and the pair of the main transistors 38 and 55 alternatively in this embodiment is performed in exactly the same way as in the embodiment in FIG. 5.

Figure 9:
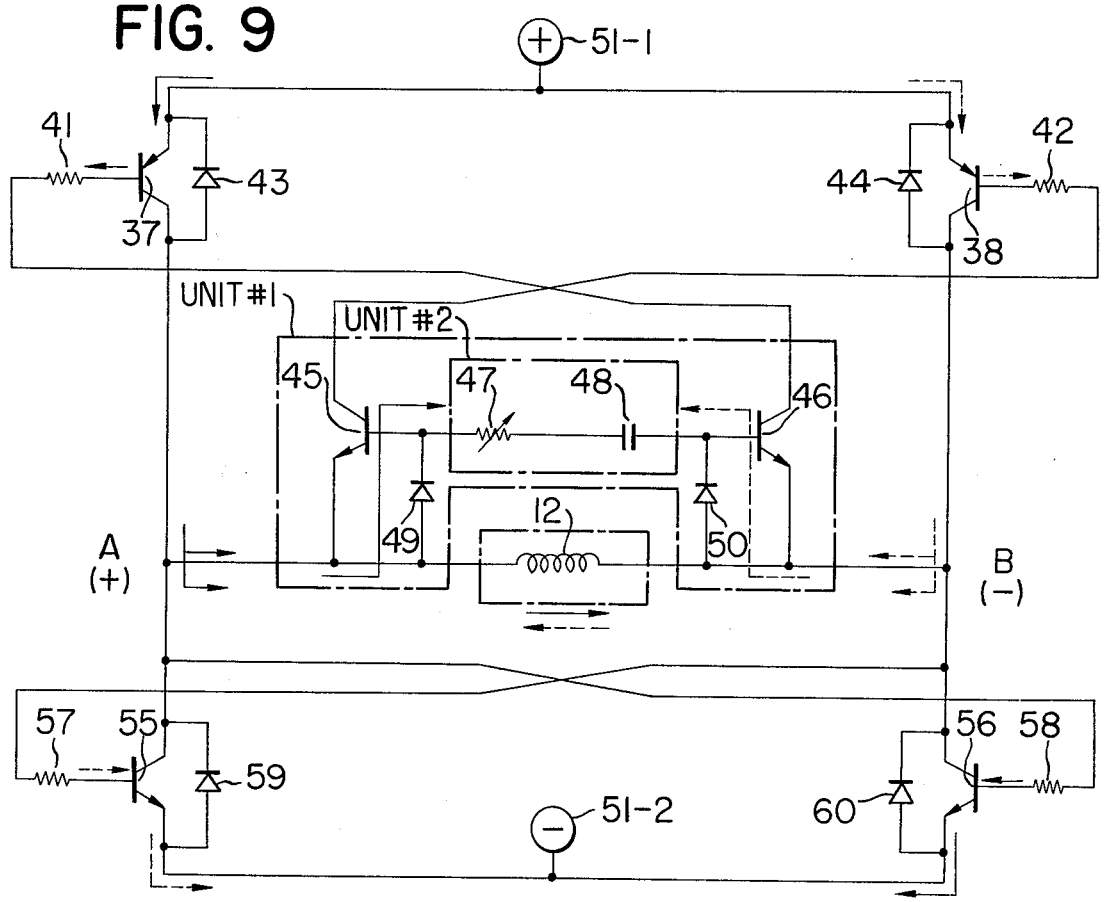

FIG. 9 shows an embodiment where the above-mentioned transistors 39 and 40 are removed while the embodiment shown in FIG. 8 employs the Darlington connected transistors 39 and 40. Numerals in the figure correspond to like numerals in FIG. 8.

As the operation of the circuit in this embodiment is the same as that in the embodiment of FIG. 8, detailed description about it is omitted. It should be noted, however, that the switching operation of transistors as shown in FIG. 6(C) is made possible by increasing the amplification factors of the main transistors 37 and 38, or decreasing the resistance values of the resistors 41 and 42. The use of only six transistors, instead of eight transistors used in the embodiment of FIG. 8, makes the embodiment of FIG. 9 less expensive.

Figure 10:
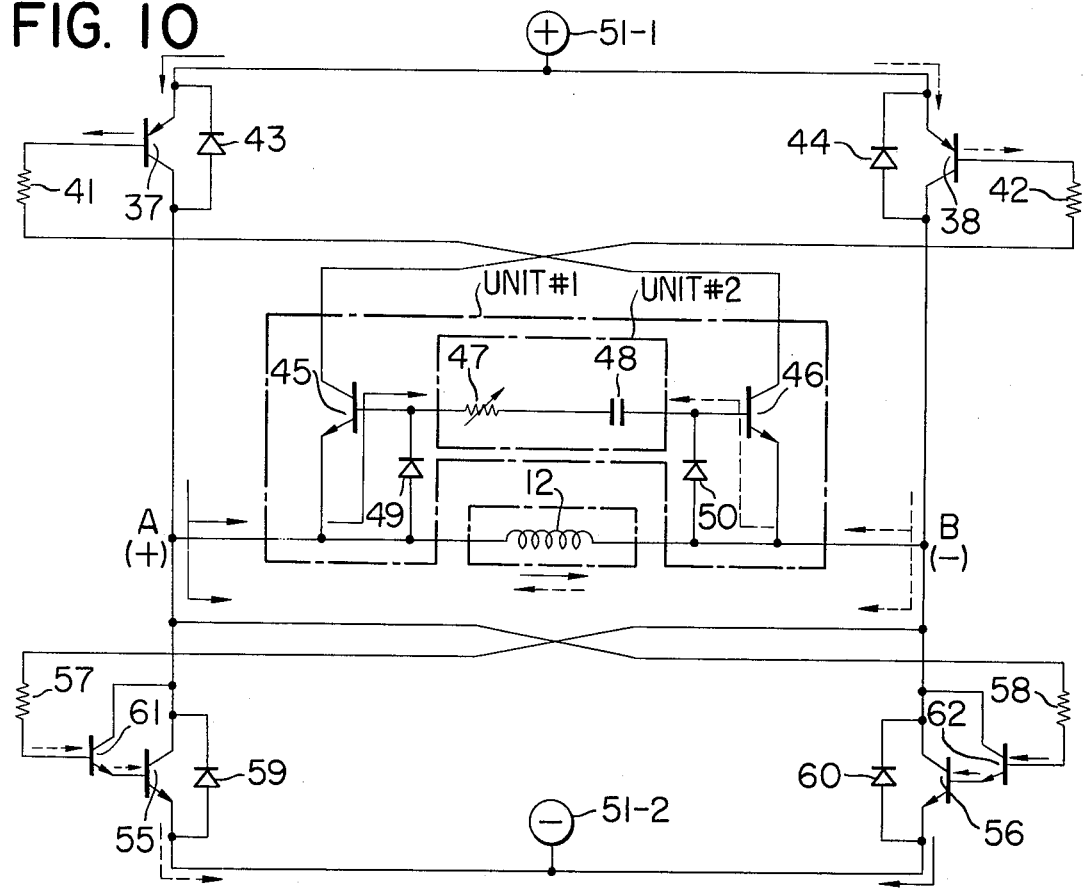

FIG. 10 shows an embodiment in which additional transistors 61 and 62 are Darlington connected to the main transistors 55 and 56 and act like the transistors 39 and 40 Darlington connected to the main transistors 37 and 38 in the embodiment of FIG. 8. Numerals in the figure correspond to like numerals in FIG. 8.

As the operation of the circuit in this embodiment is the same as that in the embodiment of FIG. 8, description about it is omitted. It should be noted, however, that since the transistors 61 and 62 are Darlington connected to the main transistors 55 and 56 the base currents of the transistors 61 and 62 can be made small and therefore the drive current of the drive coil 12 can be increased.

Figure 11:
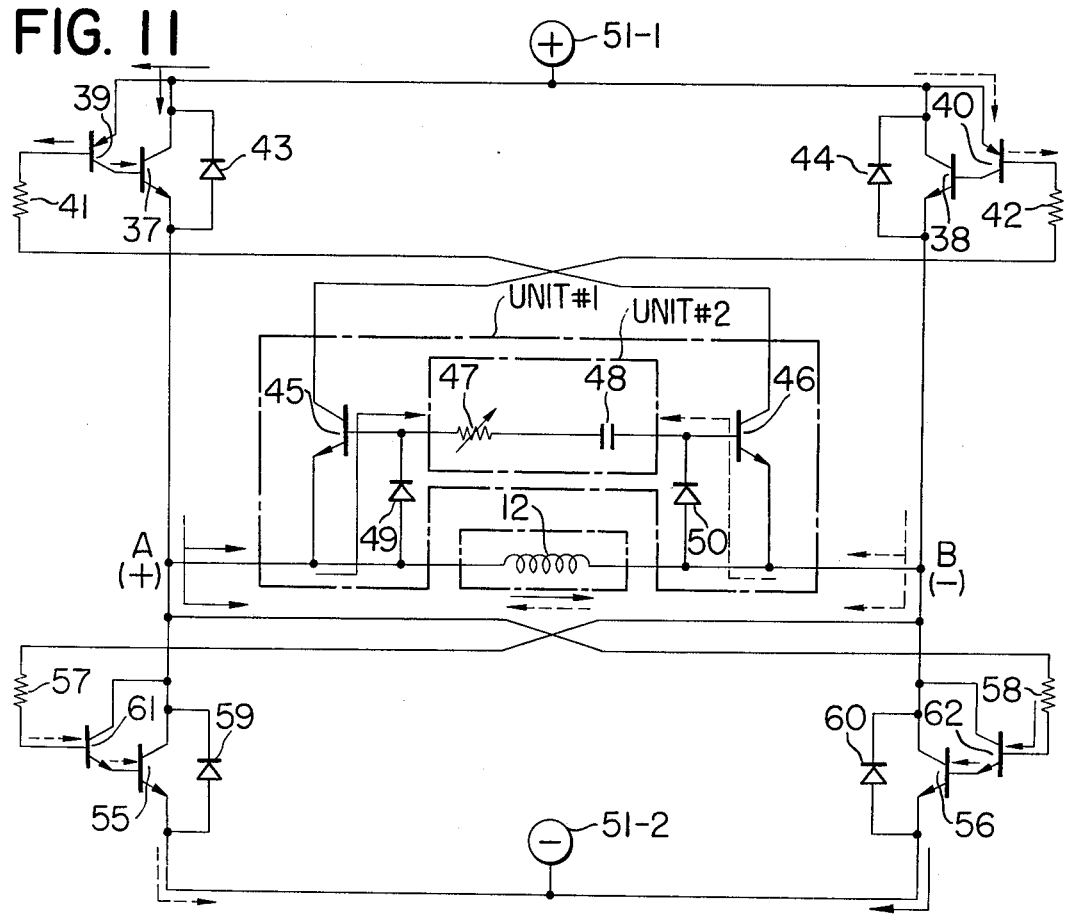

FIG. 11 shows an embodiment in which the additional transistors 39, 40, 61 and 62 are Darlington connected to all the main transistors 37, 37, 55 and 56, respectively, and numerals in the figure correspond to like numerals in FIG. 8.

As the operation of the circuit in this embodiment is essentially the same as that in the embodiments described above, description about it is omitted. It should be noted, however, that each base current supplied to the transistors 39, 40, 61 and 62 in this embodiment can be made small since the transistors 39, 40, 61 and 62 are Darlington connected to the main transistors 37, 38, 55 and 56.

Therefore embodiment shown in FIG. 10 and 11 can be constructed as large capacity electrical vibration type compressor.

Figure 12:
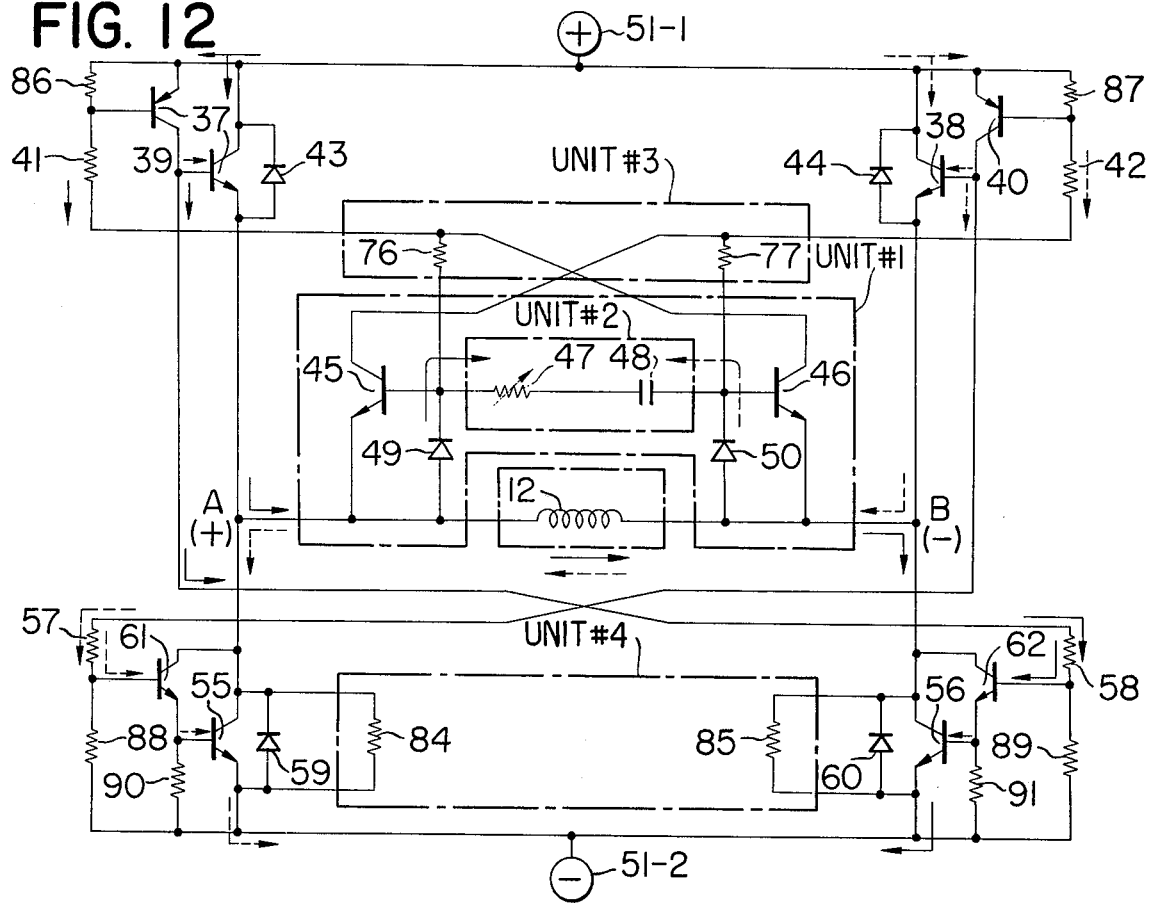

In the embodiment shown in FIG. 12, each base of the transistors 61 and 62 is connected to each base of the main transistors 38 and 37 while each base of the transistors 61 and 62 is connected to each emitter of the main transistors 38 and 37 in the embodiment of FIG. 11.

When the main transistor 37 and the transistor 39 are in the ON state (the main transistor 56 and the transistor 62 are in the ON state) and the main transistor 37 is shifted to the condition of the equation (2) or to the active region, voltage drop takes place across the collector and emitter of the main transistor 37, the voltage on the terminal A approaching the voltage on the terminal 51-2. Consequently, the charge current of the capacitor 48 flowing through the diode 49, the resistance 47, the capacitor 48, and the base of the detecting transistor 46, stops flowing and the capacitor 48 begins to discharge and the detecting transistor 46 is shifted to the OFF state. Then, the transistor 39 is switched off and the main transistor 37 is completely turned off. When the transistor 39 is turned off, each base current flowing through the base and emitter of the transistor 62, the base and emitter of the main transistor 56 stops to flow, thus the transistor 62 and the main transistor 56 are turned off.

Next, description will be made about the state where the main transistor 56 and the transistor 62 are turned on in synchronism with the transistor 39 and the main transistor 37. As mentioned above, when the main transistor 38 is turned off, the voltage on the terminal B approaches the voltage on the terminal 51-2. As the result, the capacitor 48 is turned from the charge state to the discharge state and the detecting transistor 45 is turned off. Simultaneously with this, the detecting transistor 46 is switched on. The turning-on of the detecting transistor 46 causes the transistor 39 and the main transistor 37 to turn on successively. As the transistor 39 is switched on, each base current flowing through the resistor 58, the base and emitter of the transistor 62, the base and emitter of the main transistor 56 is supplied to turn on the transistor 62 and the main transistor 56. That is, the main transistor 56 and the transistor 62 are turned on and off in synchronism with the on-off operation of the transistor 39 and the main transistor 37. Since the transistor 40, the main transistor 38, the detecting transistor 45, the transistor 61 and the main transistor 55 are symmetrical with respect to the transistor 39, the main transistor 37, the detecting transistor 46, the transistor 62 and the main transistor 56, respectively, it is needless to say that the transistor 61 and the main transistor 55 are turned on and off in synchronism with the on-off operation of the main transistor 38 and the transistor 40.

In the figure, the numerals 76 and 77 refer to resistors used as a starting current source unit No. 3, which will be described later (FIGS. 22 through 25). The numerals 84 and 85 refer to resistors used as an auxiliary starting current source unit No. 4, which will be described later in connection with FIGS. 22 through 25. The numerals 86, 87, 88, 89, 90 and 91 refer to temperature stabilizing resistors, which prevent the leakage base current from increasing due to temperature rise and reduce the leak current flowing from the collector to the emitter by bypassing the leakage current of the transistors. These temperatures stabilizing resistors, of course, can be applied similarly to each transistor in the all embodiments described in this paper.

Figure 13:
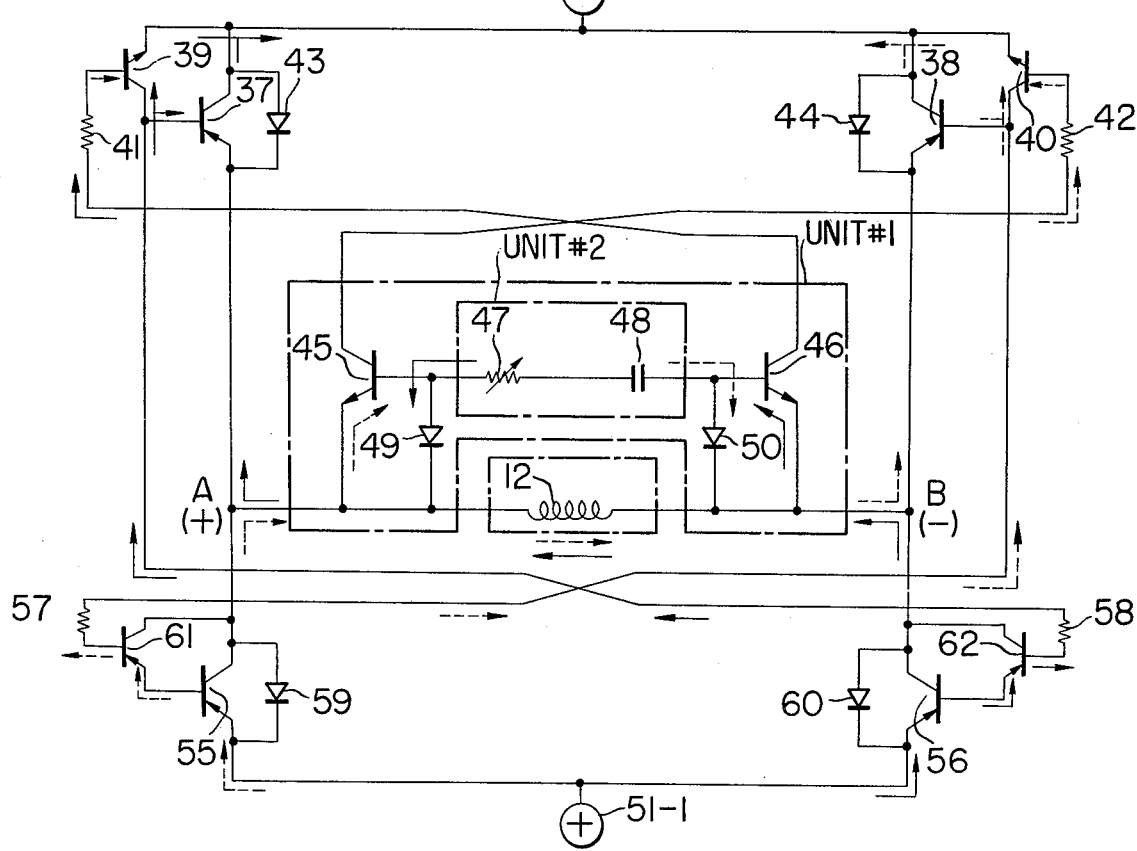

FIG. 13 shows an embodiment where PNP transistors are employed for the main transistors 37, 38, 55 and 56 as compared with NPN transistors used in the embodiment of FIG. 12. Numerals in the figure correspond to like numerals in the above-mentioned embodiments.

The circuit operation of this embodiment can be considered the same as that in the embodiment of FIG. 12. That is, when the detecting transistor 46 is turned on, the transistor 39 is turned on, with the result that the main transistors 37 and 56 are turned on, and when the detecting transistor 45 is turned on, the main transistors 38 and 55 are turned on. The circuit current flows in the direction as shown by solid lines and broken lines, respectively.

Figure 14:
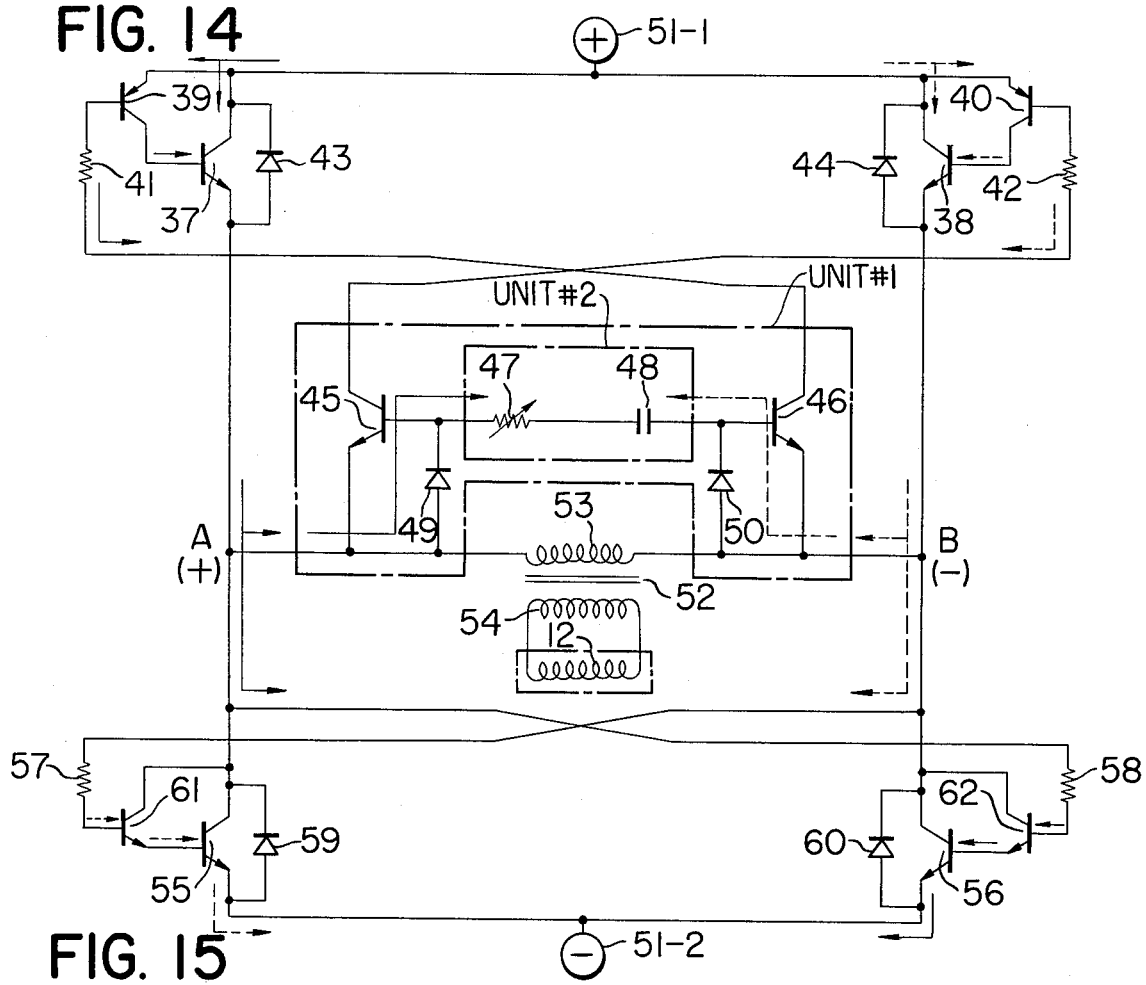

FIG. 14 shows an embodiment which is essentially the same as that of FIG. 11, except that the drive coil 12 is driven through an output transformer 52. Numerals in the figure correspond to like numerals in the embodiments described above.

In this embodiment, except that an input coil 53 is used in place of the drive coil 12, other circuit elements are the same as those in FIG. 11. Therefore an alternating current is supplied to the input coil 53, and the drive coil is 12 driven by the alternating current through the output transformer 52.

This embodiment has an advantage in that its manufacture can be simplified by using a single lead wire connecting the drive coil 12 with the metal body of the compressor used as a conductor. Moreover, this embodiment is convenient in changing the voltage applied to the compressor. Needless to say, it is possible to use an auto-transformer for the purpose of changing the voltage.

FIGS. 15 through 21 show embodiments in which separate timeconstant circuit units No. 2-1 and No. 2-2 are used in conjunction with the detecting transistors 45 and 46 to control the switching of the main transistors 37, 38, 55 and 56 while a common timeconstant circuit (a circuit comprising the variable resistor 47 and the capacitor 48) is used in the embodiments described above.

Figure 15:
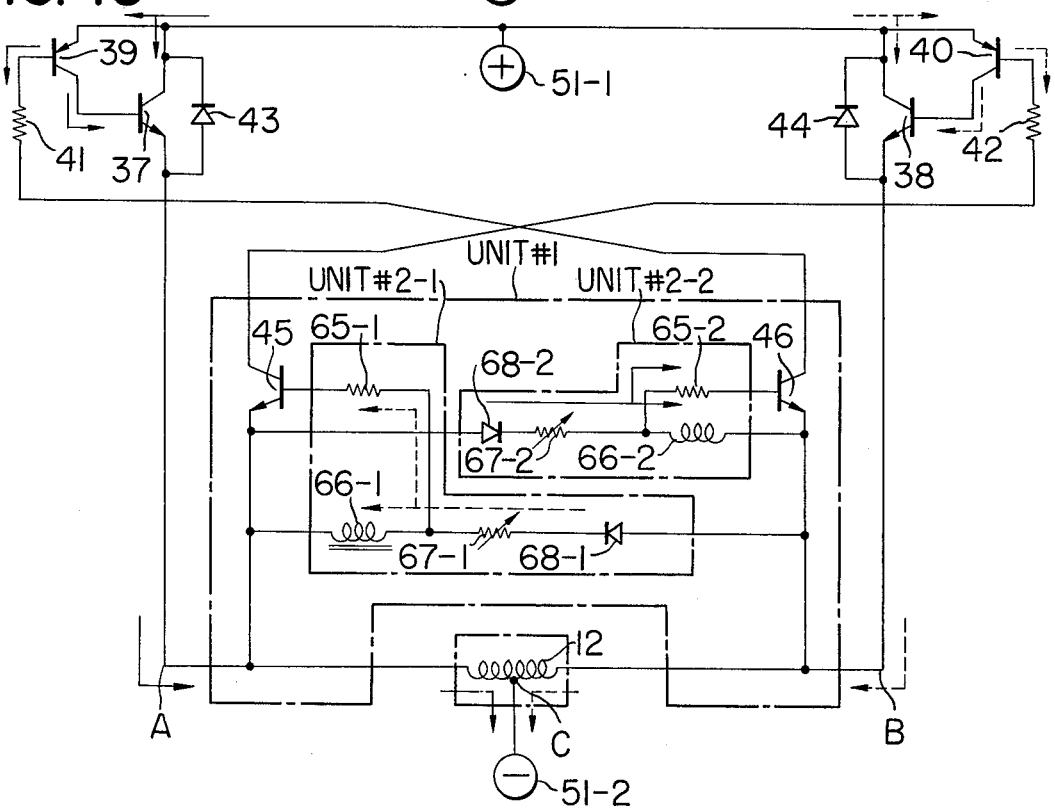

FIG. 15 shows a push-pull type drive mechanism using the main transistors 37 and 38. In the figure, the numerals 65-1 and 65-2 refer to the base resistors of the detecting transistors 45 and 46, respectively, and the numerals 66-1 and 66-2 to inductances, 67-1 and 67-2 to variable resistors, 68-1 and 68-2 to diodes, and the units No. 2-1 and No. 2-2 to timeconstant circuits. Other numerals correspond to like numerals in the embodiments described above.

Assume that a unidirectional power source voltage is applied across the circuit in the polarity as illustrated, and the circuit is put into the steady operation and switched to a state where the terminal A is positive and the terminal B negative. In such a case, a current flows to the base resistor 65-2 and the inductance 66-2 via the diode 68-2 and the variable resistor 67-2 in the direction of the arrow with a solid line as shown in the figure. Since the current supplied to the inductance 66-2 tends to remain relatively small at the initial stage and increase subsequently due to the circuit resistance value (the resistance values of the variable resistor 67-2 and other circuit elements) and the inductance value of the inductance 66-2, the current supplied to the base resistor 65-2, that is the base current of the detecting transistor 46 assumes a waveform which is relatively large at the initial stage of current supply and decrease subsequently. Therefore, the waveform of the base current can be considered just the same as that shown in FIG. 6A. In this way, when a base current is supplied to the detecting transistor 46, the detecting transistor is conducting, and then the transistor 39 and the main transistor 37 are successively turned on. The circuit current in this case is as shown by solid lines in the figure. The switching timing of the main transistor 37 is as shown in FIG. 6(C). The switching timing in this embodiment is, of course, determined by the timeconstant of the timeconstant circuit unit No. 2-2 and each amplification factor of the detecting transistor 46, the transistor 39 and the main transistor 37.

On the other hand, when the main transistor 37 is switched to the OFF state, a current is supplied to the timeconstant circuit, or the unit 2-2 in the direction of the arrows with broken lines and a base current is fed to the detecting transistor 45. The waveform of this base current is naturally similar to the waveform of the base current of the detecting transistor 46. As described above, when a base current is fed to the detecting transistor 45, the detecting transistor 45 is conducting, and as the result, the main transistor 38 is turned on. The circuit current in this case flows in the direction of the arrows with broken lines as shown in the figure. The switching timing of the main transistor 38 is determined by the timeconstant of the timeconstant circuit unit No. 2-1 and each amplification factor of the detecting transistor 45 the transistor 40 and the main transistor 38.

In the embodiments of FIGS. 5 and 7 through 17, it is necessary to select the detecting transistor 45, 46 and other transistor which have different amplification factors in order to drive the electrical vibration system in synchronism with the mechanical vibration system that has a time difference between the suction time and the compression time. In this embodiment, however, the switching of the main transistors 37 and 38 can be accomplished in synchronism with the mechanical vibration system merely by adjusting each timeconstant of the timeconstant circuit units No. 2-1 and No. 2-2.

FIG. 16 shows an embodiment where a bridge-connected drive mechanism using four main transistors is employed while the embodiment of FIG. 15 employs a push-pull type drive mechanism using two main transistors. Numerals in the figure correspond to like numerals in the embodiments described above.

When the circuit configuration of this embodiment is compared with that of the embodiment of FIG. 13, the detecting means, or the unit 1 consists of two timeconstant circuit units No. 2-1 and No. 2-2, instead of a common timeconstant circuit in the case of FIG. 13. Therefore, the operation of the entire circuit of this embodiment can be considered the same as that of the embodiment of FIG. 13. In addition, since the circuit configuration of the detecting means unit No. 1 of this embodiment is the same as that in FIG. 15, it is needless to say that the circuit operation of the detecting means unit No. 1 of this embodiment is the same as that in FIG. 15. In other words, as in the case of the embodiment of FIG. 15, the switching cycles of the main transistors 37 and 56 and the main transistors 38 and 55 are based on the timeconstants of the timeconstant circuit units No. 2-2 and No. 2-1, respectively.

Figure 17:
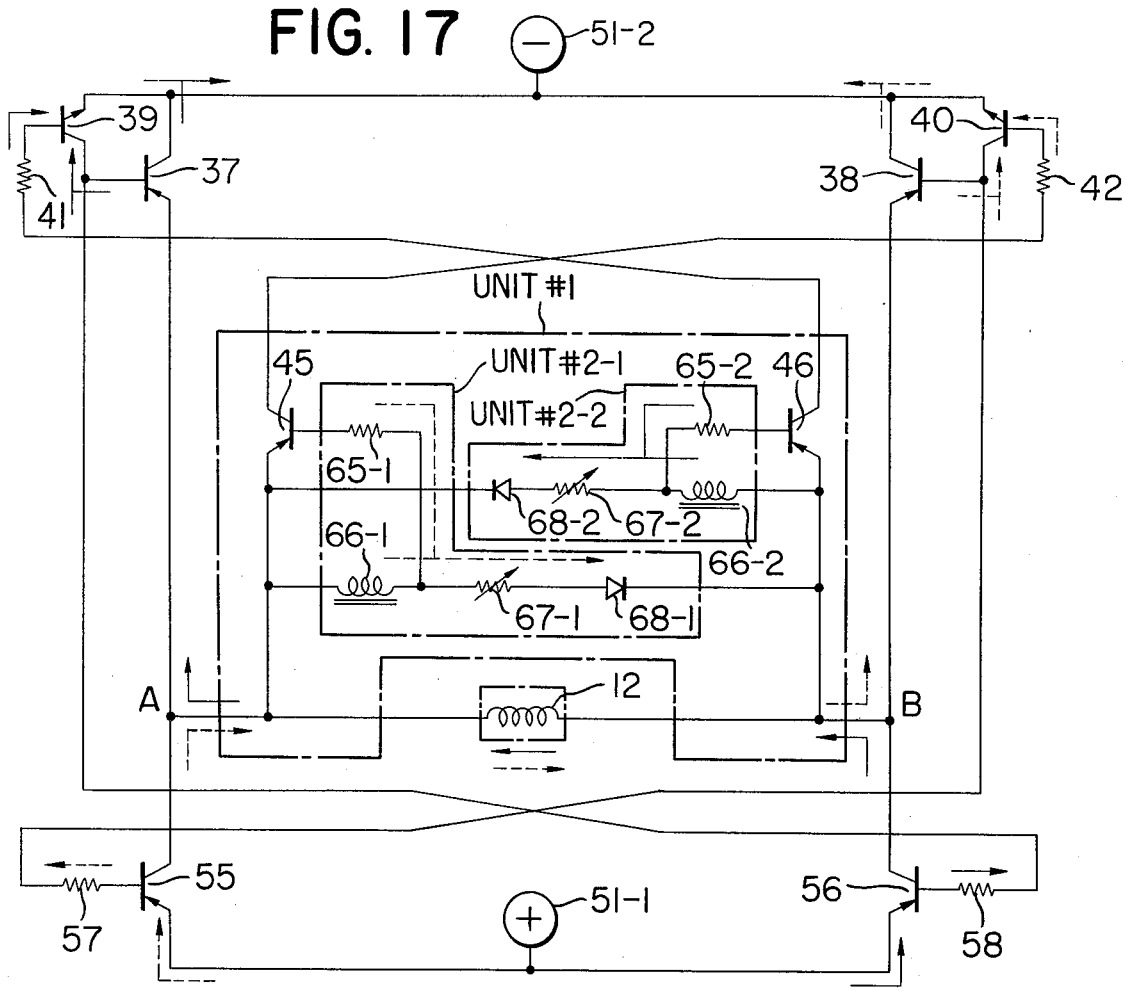

FIg. 17 shows an embodiment where PNP transistors are used for the detecting transistors 45 and 46 while the embodiment of FIG. 16 uses NPN transistors for the detecting transistors 45 and 46. Numerals in the figure correspond to like numerals in the embodiments described above.

As is evident from the figure, the direction of the current fed to the timeconstant circuits units No. 2-1 and No. 2-2 of this embodiment is opposite to that of the embodiment of FIG. 16. However, since the base currents of the detecting transistors 16 and 17 are determined by the timeconstant of the timeconstant circuit units No. 2-1 and No. 2-2, the switching cycles of the two pairs of the main transistors 37 and 56, and the main transistors 38 and 55 are the same as in FIG. 16.

FIG. 18 shows the circuit diagram of the major part of the embodiment in which capacitors are used in the timeconstant circuit units No. 2-1 and No. 2-2. The circuit configuration of the entire drive mechanism is essentially the same as that of FIG. 16 except that a different circuit is used for the detecting means unit No. 1. In the figure, the numerals 69-1 and 69-2 designate variable resistors, 70-1 and 70-2 designate capacitors, 71-1 and 71-2 designate diodes that form discharge paths for the capacitors 70-1 and 70-2. Other numerals correspond to like numerals in FIG. 16.

In the case of this embodiment, the current fed to the timeconstant circuit unit No. 2-2, that is, the base current of the detecting transistor 46 is based on the timeconstant which is determined by the capacitance of the capacitor 70-2 and the circuit resistance value (the resistance value of the variable resistor 69-2 and other circuit elements) while the base current of the detecting transistor 45 is based on the timeconstant determined by the capacitance of the capacitor 70-1 and the circuit resistance value (the resistance value of the variable resistor 69-1 and other circuit elements).

Figure 19:
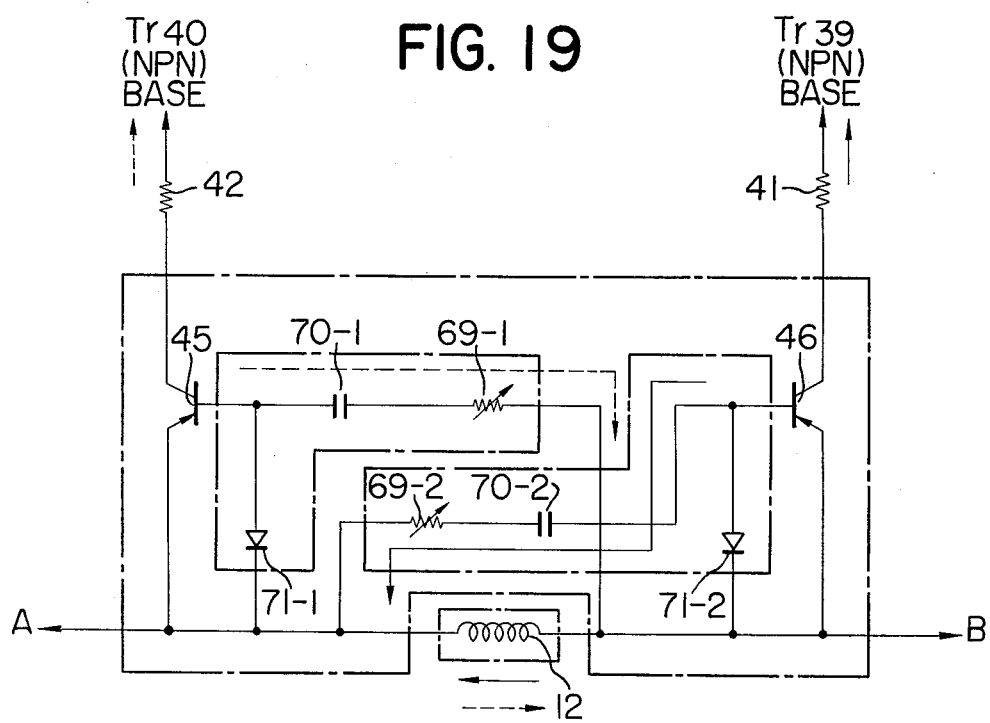

FIG. 19 shows the circuit diagram of the major part of an embodiment where PNP transistors are used for the detecting transistors 45 and 56, and at the same time, capacitors are used in the timeconstant circuit units No. 2-1 and No. 2-2. The circuit configuration of the entire drive mechanism is essentially the same as that of the embodiment of FIG. 17 except that a different circuit is used for the detecting means unit No. 1. Numerals in the figure correspond to like numerals in the embodiment of FIG. 18.

As is evident in FIG. 19, each current flows in the timeconstant circuit units No. 2-1 and No. 2-2 in the opposite direction to those in FIG. 18, but the operation of the detecting means unit No. 1 is the same as that of the embodiment in FIG. 18.

Figure 20:
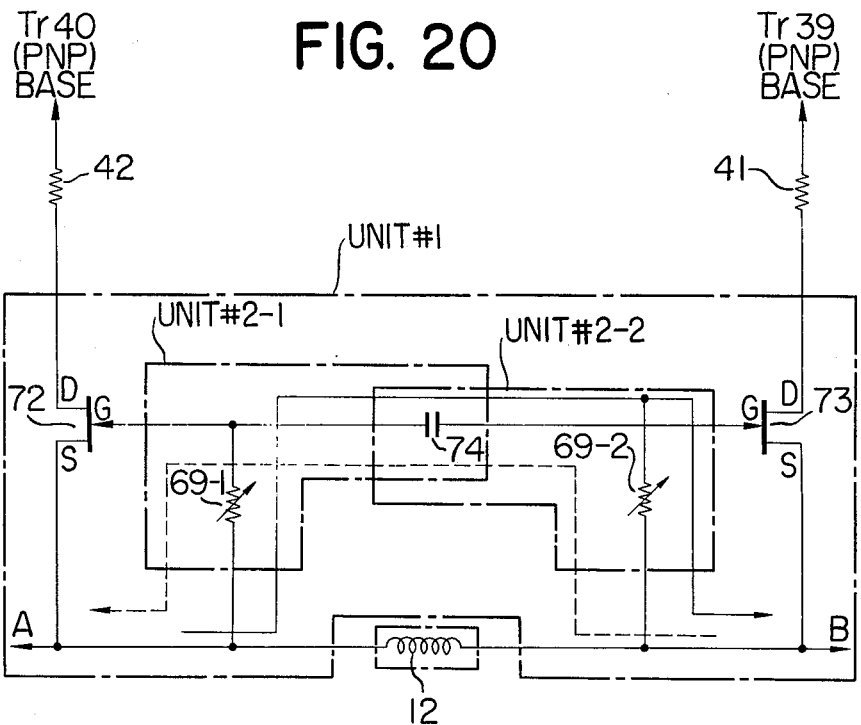

FIG. 20 shows an embodiment in which the field effect transistors 72 and 73 are used in the detecting means unit No. 1, and at the same time, the timeconstant circuit units No. 2-1 and No. 2-2, which consist of the capacitor 74, the variable resistors 69-1 and 69-2, are used.

In this embodiment, the detecting field effect transistors 72 and 73 are controlled by a current flowing in the direction of the arrow with a broken line and a current flowing in the direction of the arrow with a solid line, respectively. In other words, the detecting field effect transistor 72 is operated through voltage drop in the variable resistor 69-1 caused by the current flowing in the direction of the arrow with a broken line in the figure, and the detecting field effect transistor 73 is operated through voltage drop in the varible 69-2 caused by the current flowing in the direction of the arrow with a solid line.

Figure 21:
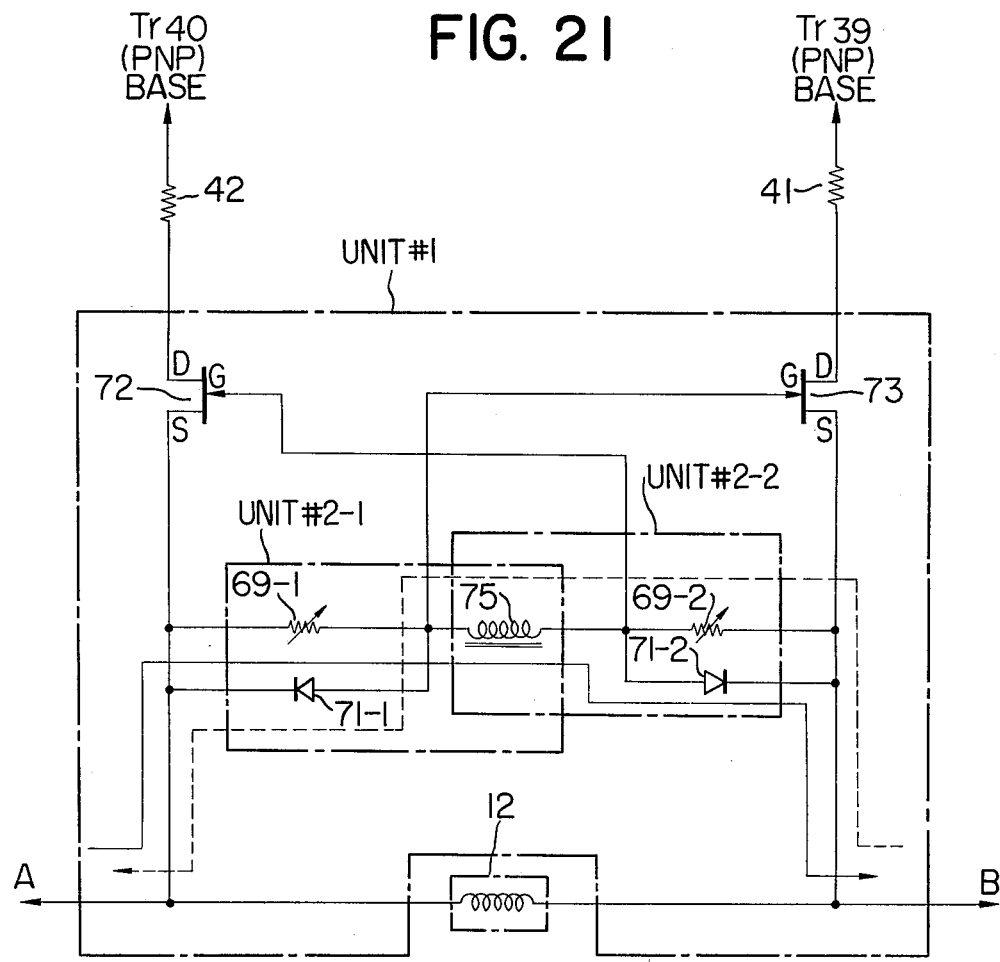

FIG. 21 shows an embodiment in which the detecting field effect transistors 72 and 73 are used as in the embodiment of FIG. 20. In the case of this embodiment, the timeconstant circuit unit No. 2-1 comprises the variable resistor 69-1, the inductance 75 and the diode 71-1, and the timeconstant circuit unit No. 2-2, comprises the variable resistor 69-2, the inductance 75 and the diode 71-2.

In this embodiment, the detecting field effect transistor 72 is operated through voltage drop in the variable resistor 69-2 and the inductance 75 caused by the current flowing in the direction of the arrow with a broken line, and the detecting field effet transistor 73 is operated through voltage drop in the variable resistor 69-1 and the inductance 75 caused by the current flowing in the direction of the arrow with a solid line in the figure.

FIGS. 22 through 25 show embodiments in which the starting of the compressor is stabilized by providing a starting current source to positively supply a starting current to the detecting means unit No. 1 at the starting stage of the compressor.

Figure 22:
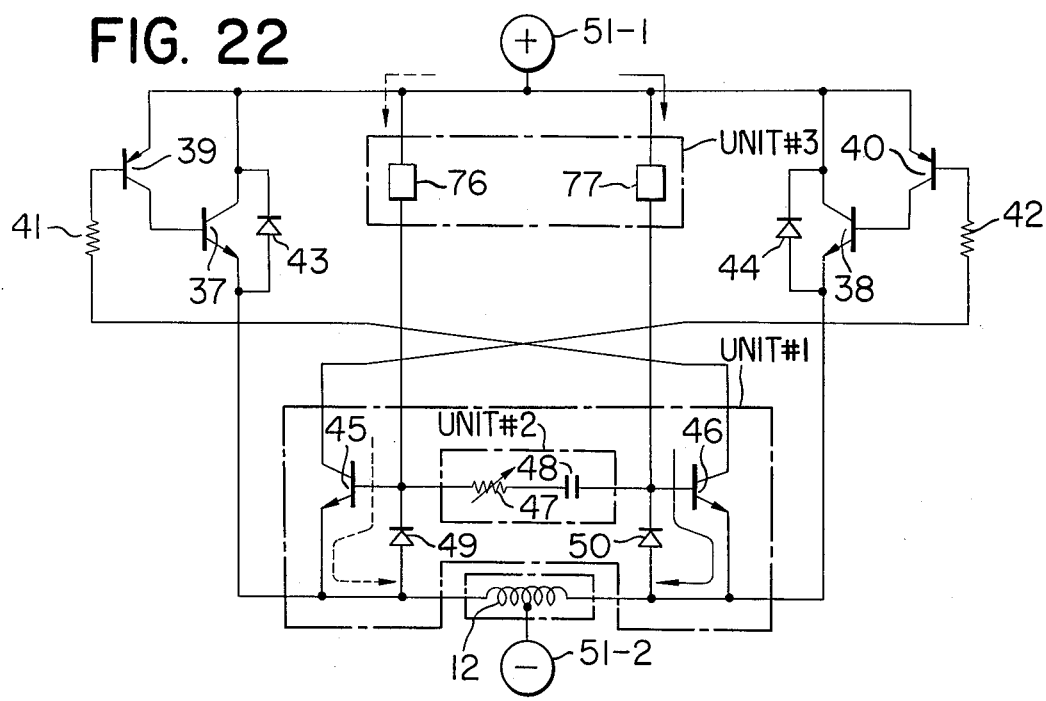

FIG. 22 shows an embodiment in which a starting current source unit No. 3 is provided in the push-pull type drive mechanism of FIG. 5. In the figure, the numerals 76 and 77 refer to impedance elements whose impedances are unbalanced. Other numerals correspond to like numerals in FIG. 5.

When the power is applied across the circuit in the polarity illustrated, currents flow simultaneously in the direction of the arrow with a solid line and in the direction of the arrow with a broken line. If the impedance of, for example, the impedance element 76 is larger than that of the impedance element 77, the current in the direction of the arrow with a solid line becomes larger than the current in the direction of the arrow with a broken line, and thus the detecting transistor 46 is conducting. Simultaneously with this, the main transistor 37 is turned on, and consequently a base current based on the timeconstant of the timeconstant circuit unit No. 2 is fed to the base of the detecting transistor 46 via the diode 49, the variable resistor 47, the capacitor 48.

In this case, the current flowing in the impedance elements 76 and 77 is selected to be smaller than the current fed from the timeconstant circuit unit No. 2 to the base of the detecting transistor 46 so as to have little effect on it. In other words, the impedance elements 76 and 77 may be fixed resistors with different resistance values. However, if the current flowing in the transistors 46, 39 and 37 are set to a different value from the current flowing in the transistors 45, 40 and 38 at the initial starting stage, the impedance elements 76 and 77 do not necessarily have to be of different values. For example, the same effect as in the case where the impedance of the impedance element 76 is set to be higher than that of the impedance element 77 can be achieved by selecting the current amplification factor of the transistor 46 in the detecting means unit No. 1 to be higher than that of the transistor 45. Moreover, the impedance elements 76 and 77 may have such resistance values that supply the bases of the detecting transistors 45 and 46 with only a slight current as compared with the base currents of the detecting transistors 45 and 46 which are determined by the timeconstant circuit unit No. 2. Needless to say, more effective impedance elements should be of such a type as the positive characteristic thermistor whose resistance value increases after the power is turned on.

Therefore, once the main transistor 37 is turned on, its switching timing is largely determined by the timeconstant of the timeconstant circuit unit No. 2 connected to the base of the detecting transistor 46. Similarly, when the main transistor 38 is in the ON state, it is needless to say that its switching timing is determined by the timeconstant of the timeconstant circuit unit No. 2.

Figure 23:
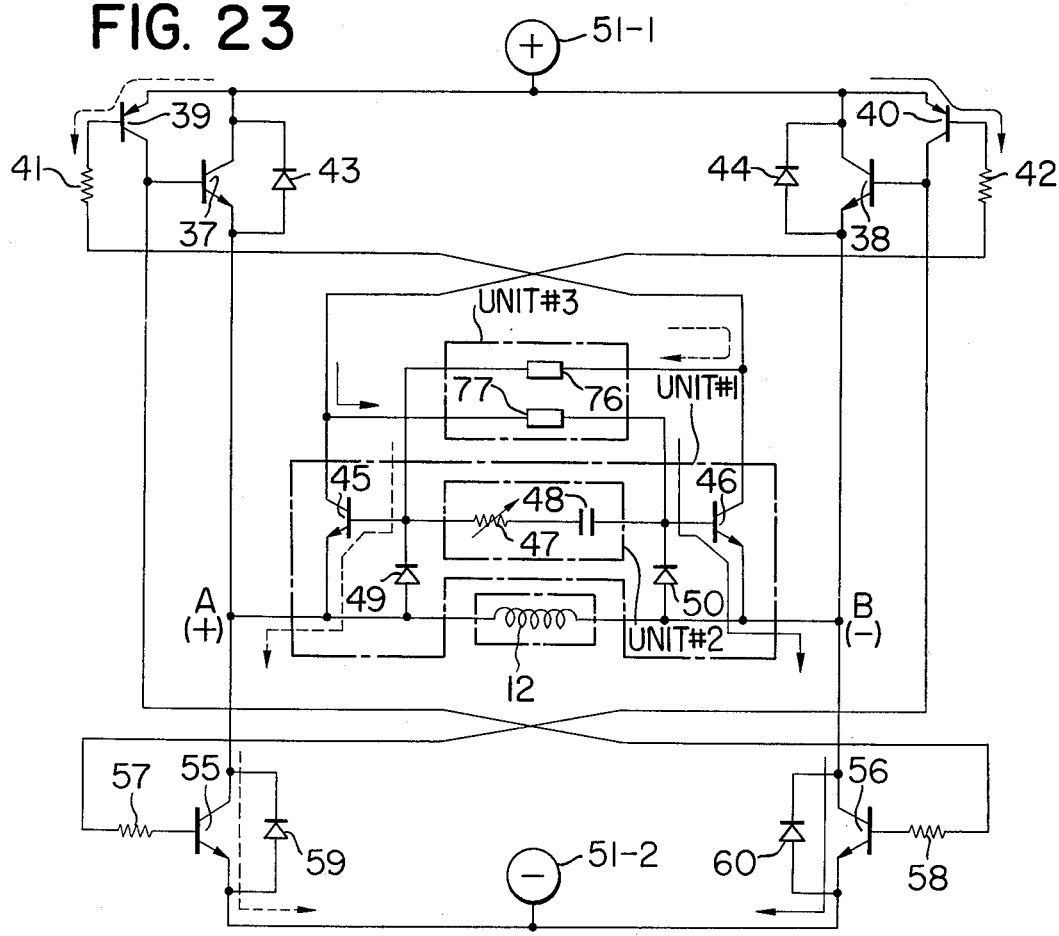

FIG. 23 shows an embodiment in which a starting current source unit No. 3 is provided in the bridge-connected drive mechanism. Numerals in the figure correspond to like numerals in FIG. 22.

When the d-c power is applied across the circuit in the polarity illustrated, current is fed to the circuit from the positive terminal 51-1 of the d-c power source through the emitter and base of the transistor 40, the resistor 42, the impedance element 77, the base and emitter of the detecting transistor 46, the collector and emitter of the main transistor 56 to the negative terminal 51-2 of the d-c power supply, as illustrated by solid lines in the figure, and at the same time, current is also fed to the current from the positive terminal of the power source through the emitter and base of the transistor 39, the resistor 41, the impedance element 76, the base and emitter of the detecting transistor 45, the collector and emitter of the main transistor 55 to the negative terminal 51-2 of the power source, as illustrated by broken lines in the figure.

In this case, if the impedance of the impedance element 76 is selected to be larger than that of the impedance element 77, a current which is larger than that fed to the base of the detecting transistor 45 is fed to the base of the detecting transistor 46 because the impedance of the entire current path indicated by solid lines is smaller than that of the entire current path indicated by broken lines in the figure. Consequently, the detecting transistor 46 is strongly turned on simultaneously with the application of the d-c power, and the transistor 39 is successively turned on, with the result that the main transistors 37 and 56 are conducting simultaneously with the application of the power. As in the case of the embodimnt of FIG. 22, the impedance elements 76 and 77 do not necessarily have to be of different values in this embodiment because the same effect can be achieved by making a difference between the current flowing in the direction of the arrows with solid lines and that flowing in the direction of the arrows with broken lines in the figure at the initial starting period by any other means.

In this way, once the main transistors 37 and 56 are conducting, a voltage almost equal to the d-c power source voltage is applied across the terminals A and B of the drive coil 12 in such a polarity that the terminal A is positive and the terminal B negative. As a result, a current based on the timeconstant of the timeconstant circuit unit No. 2 is fed to the base of the detecting transistor 46 via the diode 49, the variable resistance 47 and the capacitor 48. In this case, since the starting current source unit No. 3 is selected to supply the detecting means unit No. 1 with a negligible current compared with the base current, the switching timing of the mai transistor 38, when turned on, is largely determined by the timeconstant circuit unit No. 2. This is also true in the case of the switching of the main transistor 37.

Figure 24:
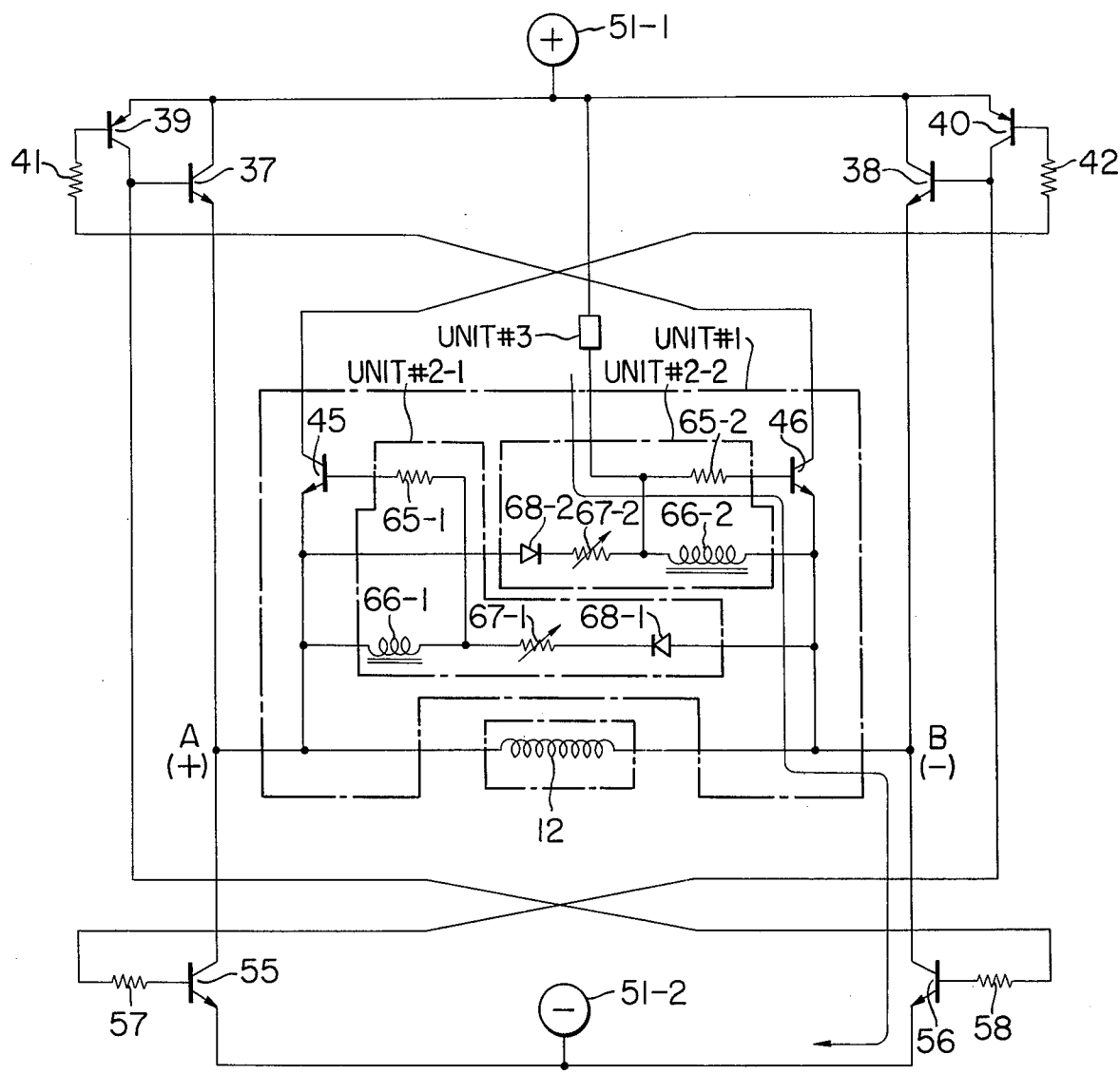

FIG. 24 shows an embodiment in which a starting current source unit No. constructed so as to turn on the detecting transistor 46 simultaneously with the application of the power is added to the drive mechanism of FIG. 16 in which the base currents of the detecting transistors 45 and 46 is controlled by means of two timeconstants circuit units No. 2-1 and No. 2-2. Numerals in the figure correspond to like numerals in FIGS. 16 and 22.

When the power is applied across the circuit in the polarity illustrated, current flows in the circuit from the starting current source unit No. 3, the base resistor 65-2, the base and emitter of the detecting transistor 46, the collector and emitter of the main transistor 56 in the direction of the arrow with a solid line. Consequently, the detecting transistor 46 is turned on, and then the main transistors 37 and 56 are conducting. Thus, a voltage almost equal to the power supply voltage is applied to the drive coil 12 with the terminal A being positive and the terminal B negative. This causes current to flow in the timeconstant circuit unit No. 2-2, which is in turn fed to the base of the detecting transistor 46. The current fed to the base of the detecting transistor 46 via the starting current source unit No. 3 is negligible as compared with the current fed to the timeconstant circuit unit No. 2-2.

Therefore, the switching operation of the main transistors 37, 56, 38 and 55 is performed in accordance with each timeconstant of the timeconstant circuit units No. 2-1 and No. 2-2, and the starting current source unit No. 3 is independent of the switching operation after the start of the compressor.

The resistors 76 and 77 (in the unit No. 3) in FIG. 12 in the above description are starting resistors whose operation is the same as the operation of the resistors 76 and 77 at the starting stage in the embodiment of FIG. 23. However, the initial starting effect is enhanced in FIG. 12 by connecting an auxiliary starting current source unit No. 4 comprising the resistors 84 and 85 between each collector and emitter of the transistors 55 and 56 while the starting current at the starting stage in FIG. 23 depends on the leakage currents between each collector and emitter of the transistors 55 and 56. It is needless to say that these starting current sources are not limited to resistors, but ca be appropriate impedance elements.

Figure 25:
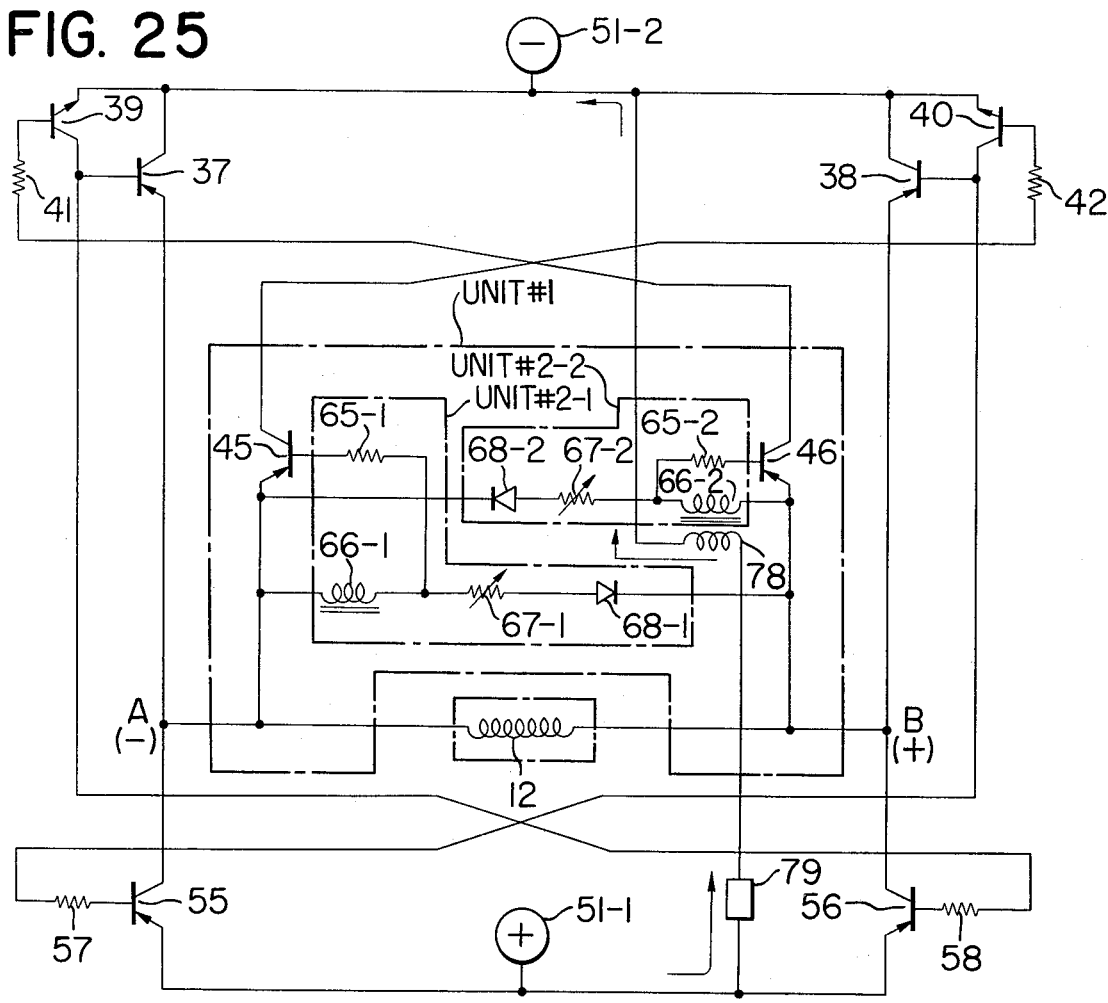

FIG. 25 shows an embodiment in which a voltage is forcibly induced in the inductance 66-2 to turn on the detecting transistor 46 at the initial starting stage by making modifications on the drive mechanism of FIG. 17 using PNP transistors for the detecting transistors 45 and 46. In this embodiment, the starting current source unit No. 3 illustrated in FIGS. 22 through 24 comprises a starting coil 78 and an impedance element 79.

When a power is supplied in the polarity illustrated, current flows in the direction of arrows with solid lines in the figure through the impedance element 79 and the starting coil 78, so a voltage is induced in the inductance 66-2 which is inductively connected to the starting coil 78, and thus the detecting transistor 46 is conducting. As the result, the main transistors 37 and 56 are turned on and a voltage is applied to the drive coil 12 with the terminal B being positive and the terminal A negative. As in the case of other embodiments, once the main transistors 37 and 56 are turned on, the switching of the main transistors 37, 56, 38 and 55 is determined by each timeconstant of the timeconstant circuit units No. 2-1 and No. 2-2, since the starting current source of this embodiment is constructed so that little voltage is induced in the inductance 66-2 after the starting period.

In the embodiments of FIGS. 22 through 25, a method to actively supply the starting current to the detecting means unit No. 1, or a method to produce a potential difference across the terminals A and B in the figures at the initial starting stage is employed. Therefore, the same effect can be achieved by other methods, for example, by utilizing the induced voltage in the drive coil 12 by forcibly vibrating the drive coil 12 from the outside.

Figure 26:
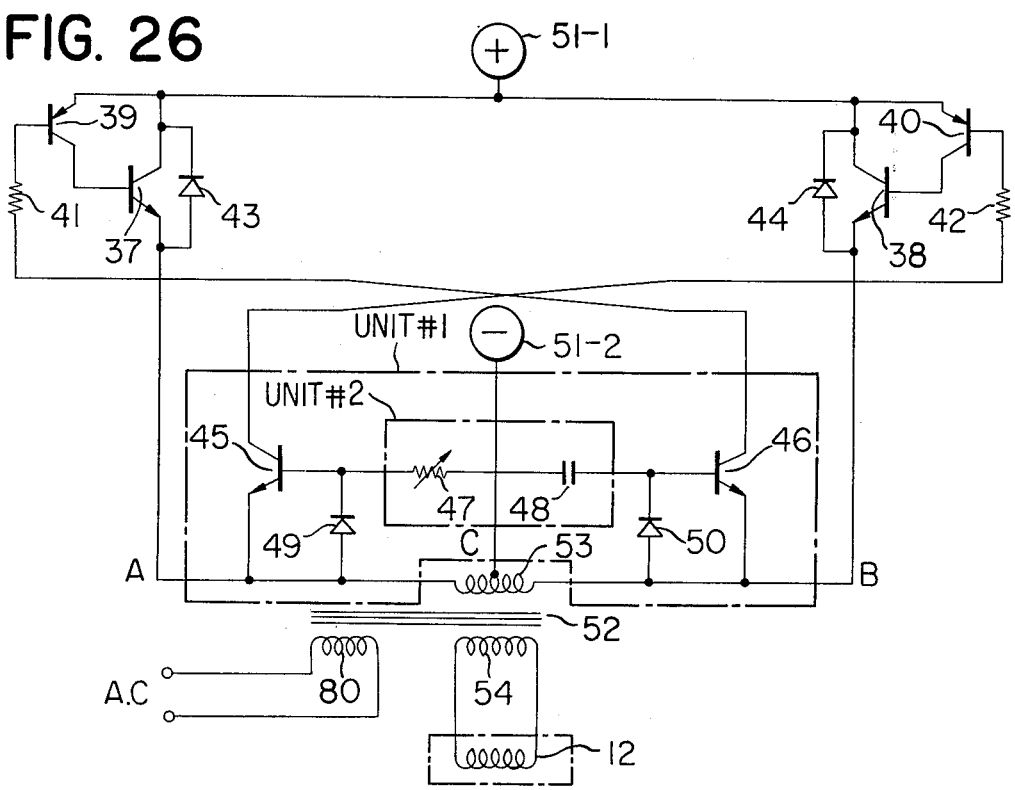
Figure 27:
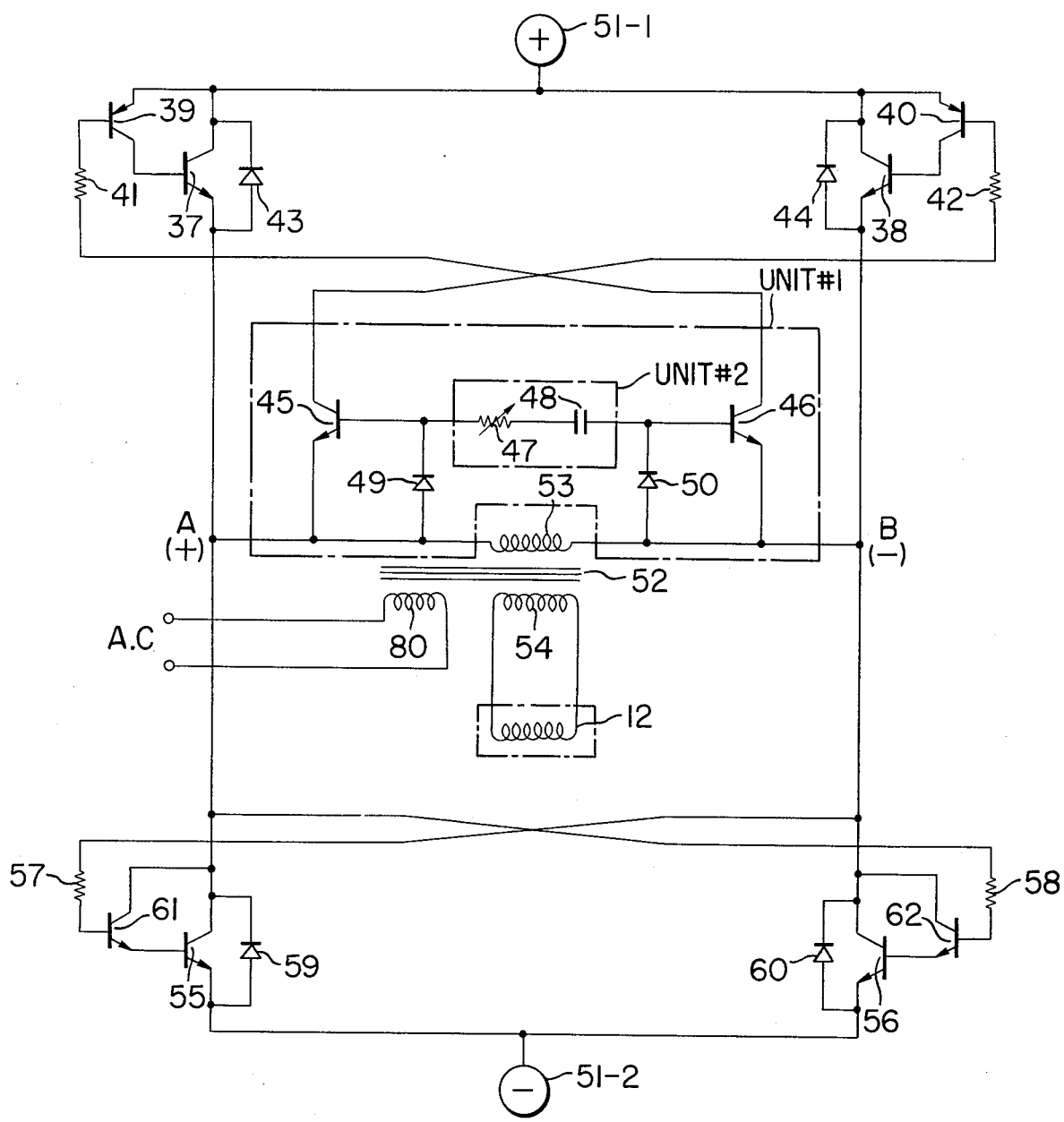
Figure 28:
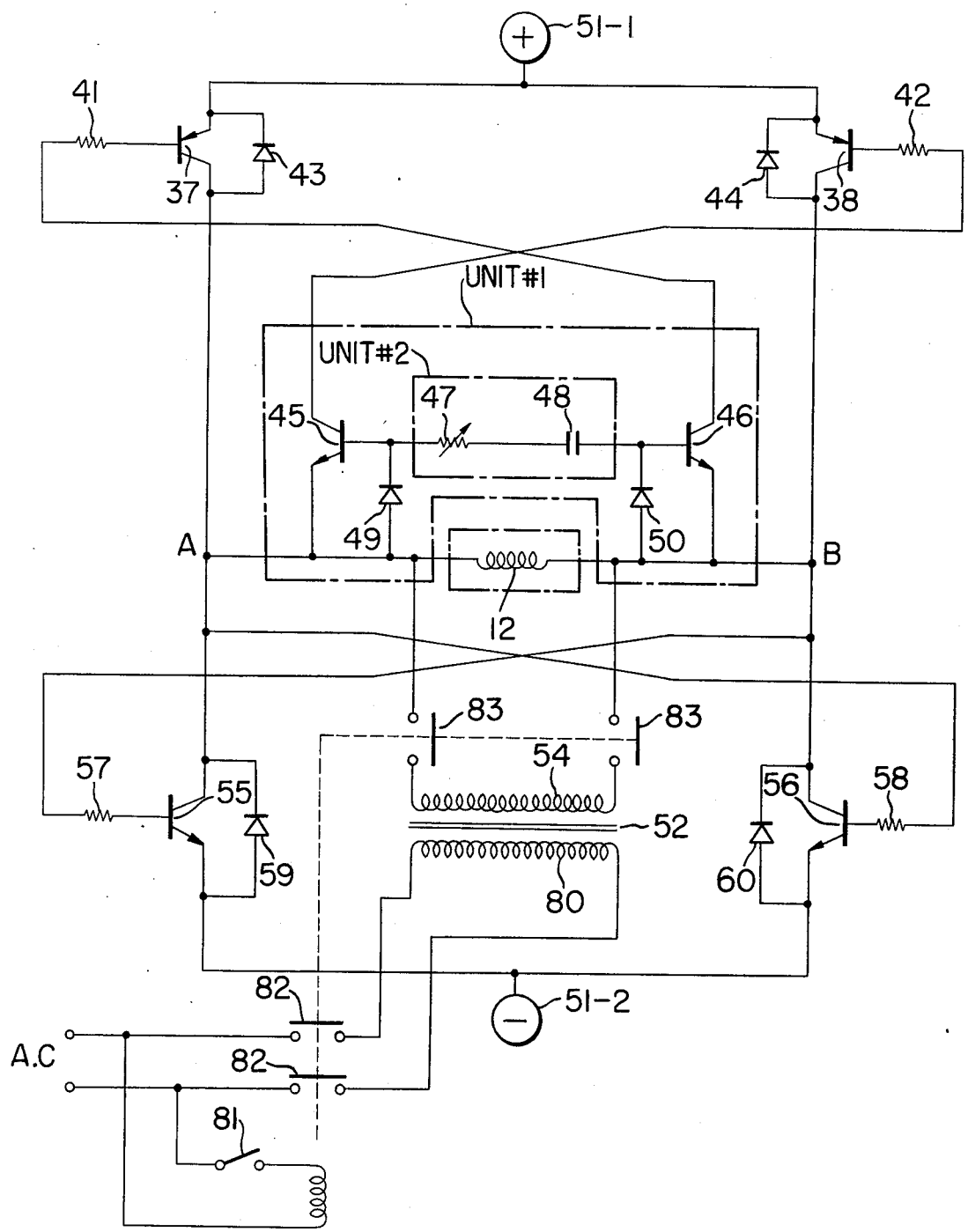

FIGS. 26 through 28 show embodiments in which the drive mechanism shown in FIGS. 7, 14 and 9 is modified to be operable by a-c power, and at the same time the d-c power source is charged during the a-c operation taking full advantage of the diodes in the drive mechanism which are used for forming a discharge path and preventing the reversed connection of the d-c power source. Each circuit operation during the d-c operation in each embodiment in FIGS. 26 through 28 is the same as that in FIGS. 7, 14 and 9, respectively, since each of their circuit configurations is the same as that in FIGS. 7, 14 and 9. Therefore, as for each embodiment of FIGS. 26 through 28, description will be made only about their circuit operation during the a-c operation.

In FIG. 26, the numeral 80 refers to an a-c input winding, and other numerals correspond to like numerals in FIG. 7.

In this embodiment, when the a-c power is applied across the circuit, an alternating drive current whose frequency is equal to that of the a-c power is supplied to the drive coil 12 via the a-c input winding 80, the output transformer 52 and the output winding 54. In that case, assume that a voltage is also induced in the d-c drive winding 53 with the terminal A being positive and the terminal B negative. Then, a closed circuit is formed by the voltage induced in the A-side winding of the d-c drive winding 53, from the terminal A through the diode 43, the + terminal 51-1 and − terminal of the d-c power source, the center tap C, and back to the terminal A, and thus the d-c power source is charged. On the other hand, when the terminal A becomes negative and the terminal B positive, a closed circuit is formed from the terminal B through the diode 44, the + terminal 51-1 and the − terminal 51-2 of the d-c power source, the center tap C, and back to the terminal B, and thus the d-c power source is similarly charged. In this case, the detecting means unit No. 1, of course, is not operated.

Numerals in FIG. 27 correspond to like numerals in FIG. 26 and 14.

In FIG. 27, when the a-c power is applied across the circuit, an alternating drive current, whose frequency is equal to that of the a-c power source, is fed to the drive coil 12 via the a-c input winding 80, the output transformer 52 and the output winding 54. At this moment, a voltage corresponding to the frequency of the a-c power source is induced in the exciting winding 53. Now, assuming that the terminal A becomes positive and the terminal B negative, a closed circuit is formed from the terminal A through the diode 43, the + terminal 51-1 and the − terminal 51-2 of the d-c power source, the diode 60, the terminal B, the exciting winding 53 and back to the terminal A, and thus the d-c power source is charged. On the other hand, when the terminal A is negative and the terminal B positive, a closed circuit is formed from the terminal B through the diode 44, the + terminal 51-1 and the − terminal 51-2 of the d-c power source, the diode 59, the terminal A, the exciting winding 53 and back to the terminal B, and thereby the d-c power source is charged in the same way. In this case, needless to say, the detecting means unit No. 1 is not operated.

In FIG. 28, the numeral 81 refers to a switch for the a-c power source, and the numerals 82 and 83 to switching contacts which form an a-c drive circuit. Other numerals correspond to like numerals in FIGS. 9 and 26.

In the a-c operation in which the switch 81 is turned on, the switching contacts 82 and 83 are turned on, whereby the drive coil 12 is driven via the a-c input winding 80, the transformer 52, the output winding 54. At the same time, if the voltage induced across the output winding 54 is of such a polarity that the terminal A is positive and the terminal B negative, a circuit is formed from the terminal A through the diode 43, the + terminal 51-1 and the − terminal 51-2, the diode 60, the terminal B, the output winding 54, and back to the terminal A, whereby the d-c power source is charged. On the contrary to the above case, if the terminal A is negative and the terminal B positive, a circuit is formed from the terminal B, the diode 44, the + terminal 51-1 and the − terminal 51-2 of the d-c power source, the diode 59, the terminal A, the output winding 54, and back to the terminal B, whereby the d-c power source is charged.

Figure 29:
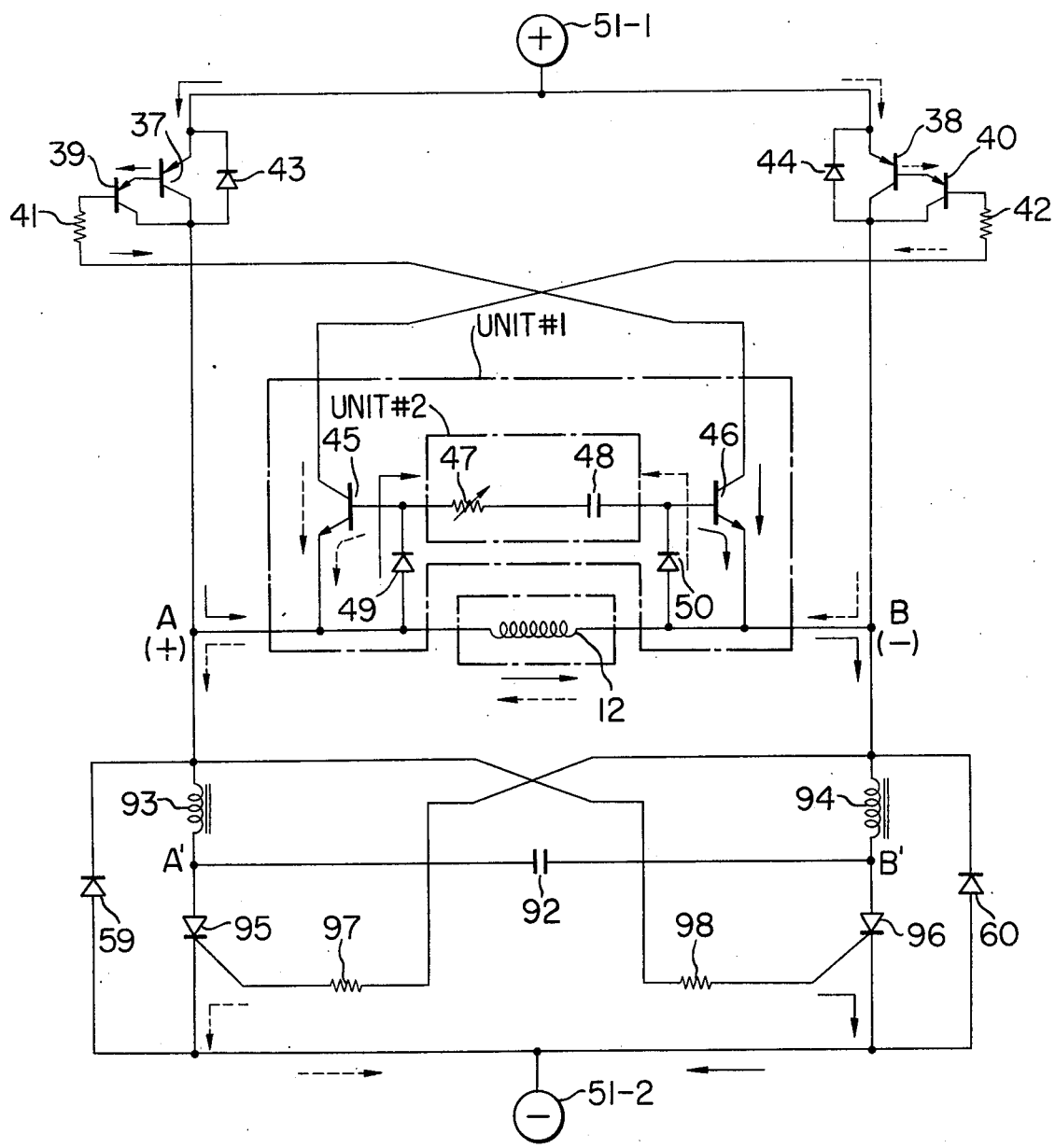

FIG. 29 shows an embodiment in which a bridge circuit is formed with the two main transistors 37 and 38 which are turned on and off alternately and the two thyristors 95 and 96 which are turned on and off alternately in synchronism with the on-off operation of the main transistors 37 and 38, as compared with the embodiments of FIGS. 8 through 13, FIG. 16, FIG. 17, FIGS. 23 through 25, FIG. 27 and FIG. 28 in which four main transistors constitute a bridge circuit. In FIG. 29, numerals correspond to like numerals in other embodiments, except that the numeral 92 refers to a commutating capacitor, the numerals 93 and 94 to commutating reactors, the numerals 95 and 96 to thyristors, and the numerals 97 and 98 to gate resistors.

In the figure, when the main transistor 37 is in the ON state and the main transistor 38 is in the OFF state, the potential on the terminal A is almost equal to that on the terminal 51-1. Consequently, a gate current flows across the gate and cathode of the thyristor 96 through the gate resistor 98, and thereby the thyristor 96 is turned on. Therefore, current flows in the circuit in the direction of the arrows with solid lines in the figure. Under this state, one terminal A' of the commutating capacitor 92 is charged at almost the same voltage (that is, positively) as the potential on the terminal A through the commutating reactor 93, and the other terminal B' is charged at almost the same voltage (that is, negatively) as that on the terminal 51-2 since the thyristor 96 is turned on.

Next, the main transistor 37 is turned off and the main transistor 38 is on. The principle of this process is the same as in the above-mentioned embodiments, so the description about it is omitted. Under this state, the potential on the terminal B is almost the same as the voltage on the terminal 51-1 since the commutating reactor 94 is inserted between the terminals B and B' despite that the thyristor 96 is in the ON state. Consequently, a gate current is fed to the gate and cathode of the thyristor 95 through the gate resistor 97 simultaneously with the main transistor 38 being turned on. Then, the thyristor 95 is conducting, and the voltage of the commutating capacitor 92 biases the cathode of the thyristor 96 positively and the anode of the same negatively, whereby the thyristor 96 is completely turned off. Under this state, therefore, the circuit current flows in the direction of the arrows with broken lines in the figure, and a current is fed to the drive coil 12 in the opposite direction to that in the state mentioned above. Under this state, one terminal A' of the commutating capacitor 92 is charged at almost the same voltage (that is, negatively) as that on the terminal 51-2, and the other terminal B' is charged at almost the same voltage (that is, positively) as that on the terminal 51-1.

Next, when the main transistor 37 is turned on and the main transistor 38 is turned off, the voltage on the terminal A becomes almost the same as that on the terminal 51-1, permitting the gate current of the thyristor 96 to flow via the gate resistor 98, whereby the thyristor 96 is turned on. Then, the voltage on the commutating capacitor 92 biases the cathode of the thyristor 95 positively and the anode of the same negatively. With this, the thyristor 95 is completely cut off. Therefore, throughout the entire process of operations of this circuit, the thyristors 95 and 96 perform the switching operation (on-off operation) in synchronism with the switching operation (on-off operation) of the main transistors 37 and 38 to supply the drive coil 12 with an alternating current.

In the bridge circuit configuration described above, the detecting means unit No. 1 detects the motion of the drive coil 12 and participates in the switching operation of the main transistors 37 and 38 in accordance with the switching conditions expressed by the equations (1) and (2) while the other main transistors 55 and 56 or the thyristors 95 and 96 are the mere switching means in synchronization with the on-off operation of the main transistors 37 and 38. Therefore, the main transistors 55 and 56 or the thyristors 95 and 96 are, dependent switching elements of the main transistors 37 and 38 so to speak, the main transistors 37 and 38 assume a first group while the other main transistors 55 and 56 or the thyristors 95 and 96 are a second group, and which can be substituted with elements other than transistors or thyristors. One of readily applicable means for such purpose is a magnetic switching means, for example, which description is omitted.

It is needless to say that it is possible to feed signals directly to the main transistors 55 and 56, or the thyristors 95 and 96 from the unit No. 1.

In the above described bridge circuit, FIG. 16 and 17 and FIG. 23 through 25, are so configured that ON-OFF operation between first group main transistors 37 and 38 and second group main transistors 55 and 56 are accorded with switching timing controlled by the detecting transistors 45 and 46 which supply the signals, therefore these bridge circuits have merits that the switch through can be avoided.

As described above, this invention eliminates the need for a feedback controlling transformer which has been used in compressors of the conventional type for controlling the base currents of the main transistors by providing a detecting means unit No. 1 in parallel with the drive coil 12 to control the base currents of the main transistors 37, 38, or the main transistors 37, 38, 55 and 56 in accordance with the timeconstant of the timeconstant circuit unit No. 2 or the timeconstant circuit units No. 2-1 and No. 2-2 in the detecting means unit No. 1, whereby the switching of the main transistors is performed in synchronization with the mechanical vibration system of the compressor. This brings that the entire compressor efficiency minimizes the consumption of d-c power, small in size and light in weight.

This invention makes it possible to provide a compressor which can be operated by both a-c and d-c power sources by providing an output transformer 52 in the drive mechanism having a detecting means unit No. 1 without the use of a feedback controlling transformer.

In addition, this invention makes it possible to charge the d-c power supply mentioned above during the a-c operation taking advantage of the diodes connected in the reversed direction across the collector and emitter of the main transistors.

What is claimed is:

1. An electrical vibration type compressor comprising a single drive coil supported in a mechanical vibration system and capable of vibrating under a free stroke mode therein, a piston driven by said drive coil and vibrating resonantly with the natural frequency of the mechanical vibrating system, at least one main semiconductor element with a control electrode for controlling the switching so as to apply alternating drive current to said single drive coil, and a detecting means consisting of at least one detecting semiconductor element with a control electrode for detecting the vibration of the drive coil and controlling the conduction and turn off of the main semiconductor element in response thereto, and at least one time constant circuit interconnected between said detecting semiconductor element and said main semiconductor element; wherein the conduction and turn off of the main semiconductor element is performed at a maximum point of current and a minimum point of counter electromotive force of the drive coil, corresponding to the top and bottom dead centers of the piston which operates with said vibration under the free stroke mode, such that an electrical vibration system, including the main semiconductor element and the detecting means, is driven in synchronization with the vibration of the mechanical vibration system.

2. An electrical vibration type compressor as in claim 1, wherein the base current of the main semiconductor element is controlled by said detecting means to have a waveform which sharply increases at a point of time immediately after the switching of said main semiconductor element and attenuates after a lapse of time thereafter, and wherein said switching occurs when the maximum point of the collector current of the main semiconductor element is at the top and bottom dead centers of the piston vibrating under the free stroke mode, said switching taking place when:

$$I_C \geq h_{FE} \cdot I_B$$

wherein $I_C$ is the collector current of the main semiconductor element, $I_B$ is the base current thereof and $h_{FE}$ is the amplification factor thereof and wherein the compressor resonantly vibrates under the above equation.

3. An electrical vibration type compressor as in claim 2, and further comprising an output transformer having a primary winding connected in parallel with said detecting means and a secondary winding supplying said drive coil with the drive current.

4. An electrical vibration type compressor as in claim 2, wherein said detecting means comprises two detecting semiconductor elements and a single time constant circuit.

5. An electrical vibration type compressor as in claim 2, wherein said detecting means comprises two detecting semiconductor elements, a first time constant circuit corresponding to the compression stroke of said piston, and a second time constant circuit corresponding to the suction stroke thereof.

6. An electrical vibration type compressor as in claim 2, wherein said time constant circuit comprises an inductance and a resistor.

7. An electrical vibration type compressor as in claim 2, wherein said detecting semiconductor element is a field effect transistor.

8. An electrical vibration type compressor as in claim 2 and including at least two main semiconductor elements and at least two detecting semiconductor elements and a time constant circuit formed by at least one capacitor and at least one resistor connected in series, the opposite ends of said series connection being interconnected between control electrodes of said two detecting semiconductor elements and the main electrode paths of said two detecting semiconductor elements being respectively connected to said drive coil, said main semiconductor elements together providing first and second states during which opposite ones are respectively on and off, said time constant circuit supplying one of said detecting semiconductor elements with a current during a first state of said main semiconductor elements, and supplying the other of said detecting semiconductor elements with a current during a second state of said main semiconductor elements, said currents having a waveform with a sharp rise time and then attenuating after a time lapse.

9. An electrical vibration type compressor as in claim 8 wherein said main semiconductor elements are connected in a bridge arrangement.

10. An electrical vibration type compressor as in claim 9, wherein said main semiconductor elements include a first group of main semiconductor elements connected to the detecting means for controlling the drive current to the drive coil, and a second group of main semiconductor elements switching in synchronization with the switching of the first group of main semiconductor elements.

11. An electrical vibration type compressor as in claim 10, wherein said said second group of main semiconductor elements are thyristor devices.

12. An electrical vibration type compressor as in claim 9, wherein at least one pair of main semiconductor elements which are oppositely on and off are Darlington connected transistors.

13. An electrical vibration type compressor as in claim 9, wherein the control electrodes of at least one pair of main semiconductor elements which are oppositely on and off are respectively connected to a first detecting semiconductor element and a second detecting semiconductor element.

14. An electrical vibration type compressor as in claim 13, wherein said main semiconductor elements are interconnected such that when each of said pair of main semiconductor element is respectively switched to the on state, another main semiconductor element from another pair of main semiconductor elements is successively switched to the on state.

15. An electrical vibration type compressor as in claim 13, wherein the control electrodes of the main semiconductor elements which are simultaneously turned on and off are commonly connected to said respective first and second detecting semiconductor elements.

16. An electrical vibration type compressor as in claim 8, wherein said main semiconductor elements include two main semiconductor elements which are alternately turned on and off.

17. An electrical vibration type compressor as in claim 48, wherein each of said two main semiconductor elements include Darlington connected transistors.

18. An electrical vibration type compressor as in claim 16, wherein the control electrodes of said two main semiconductor elements are respectively connected to a first detecting semiconductor element and a second detecting semiconductor element.

19. An electrical vibration type compressor as in claim 8, further comprising means for generating a potential across the drive coil to facilitate the initial starting of the compressor at the moment when a power supply is turned on.

20. An electrical vibration type compressor as in claim 19, wherein said main semiconductor elements are connected in a bridge arrangement.

21. An electrical vibration type compressor as in claim 20, further comprising means for forcibly supplying a starting current to the control electrodes of at least two detecting semiconductor elements.

22. An electrical vibration type compressor as in claim 20 wherein said main semiconductor elements include a first group of main semiconductor elements and a second group of main semiconductor elements which perform a switching operation in synchronization with said first group of main semiconductor elements, and further comprising an impedance element connected in parallel across the terminals of each semiconductor element of said second group of main semiconductor elements to facilitate a starting current in the initial starting period of the compressor.

23. An electrical vibration type compressor as in claim 19, wherein said main semiconductor elements include two main semiconductor elements which are alternately turned on and off.

24. An electrical vibration type compressor as in claim 23, further comprising means for forcibly supplying a starting current to the control electrodes of at least two detecting semiconductor elements.

25. An electrical vibration type compressor as in claim 1, wherein an alternating current is supplied to the drive coil.

26. An electrical vibration type compressor as in claim 2, further comprising diodes reversely connected in parallel across said main semiconductor elements.

27. An electrical vibration type compressor as in claim 1, further comprising a DC power source for energizing the electrical vibration system, diodes reversely connected in parallel across said main semiconductor elements, and an AC power source providing an alternating current to said drive coil such that when the AC power source is connected, it charges the D-C power source through the diodes.

28. An electrical vibration type compressor as in claim 2, further comprising resistors connected between the control electrode and other electrodes of the main semiconductor elements for maintaining thermal stability by reducing the leakage current of the semiconductor elements.

* * * * *

UNITED STATES PATENT AND TRADEMARK OFFICE
CERTIFICATE OF CORRECTION

PATENT NO. : 4,027,211
DATED : May 31, 1977
INVENTOR(S) : Morikazu Omura; Yukio Okuda, Hiroyuki Kainuma It is certified that error appears in the above—identified patent and that said Letters Patent are hereby corrected as shown below:

Page 1, left column add:

-- [30] Foreign Application Priority Data

April 9, 1974  Japan  49-40191

August 8, 1974  Japan  49-91073

August 8, 1974  Japan  49-91074

August 21, 1974  Japan  49-95685

Signed and Sealed this

Thirteenth Day of September 1977

[SEAL]

Attest:

RUTH C. MASON
*Attesting Officer*

LUTRELLE F. PARKER
*Acting Commissioner of Patents and Trademarks*

UNITED STATES PATENT AND TRADEMARK OFFICE
CERTIFICATE OF CORRECTION

PATENT NO. : 4,027,211
DATED : May 31, 1977
INVENTOR(S) : Morikazu Omura; Yukio Okuda; Hiroyuki Kainuma It is certified that error appears in the above-identified patent and that said Letters Patent are hereby corrected as shown below:

Column 22 line 32:

change "Claim 48" to --Claim 16--.

Signed and Sealed this

Twenty-eighth Day of February 1978

[SEAL]

Attest:

RUTH C. MASON
Attesting Officer

LUTRELLE F. PARKER
Acting Commissioner of Patents and Trademarks